(12) United States Patent
Shiba

(10) Patent No.: US 7,841,430 B2
(45) Date of Patent: Nov. 30, 2010

(54) TRANSMISSION

(75) Inventor: Kenji Shiba, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 377 days.

(21) Appl. No.: 11/996,216

(22) PCT Filed: Jul. 18, 2006

(86) PCT No.: PCT/JP2006/314141

§ 371 (c)(1),
(2), (4) Date: Jan. 18, 2008

(87) PCT Pub. No.: WO2007/010883

PCT Pub. Date: Jan. 25, 2007

(65) Prior Publication Data

US 2009/0105030 A1 Apr. 23, 2009

(30) Foreign Application Priority Data

| Jul. 19, 2005 | (JP) | ............................. | 2005-208878 |
| Jul. 19, 2005 | (JP) | ............................. | 2005-208879 |
| Jul. 19, 2005 | (JP) | ............................. | 2005-208880 |
| Jul. 19, 2005 | (JP) | ............................. | 2005-208881 |
| Jul. 19, 2005 | (JP) | ............................. | 2005-208882 |

(51) Int. Cl.
*B60K 17/28* (2006.01)
(52) U.S. Cl. ..................... 180/53.4; 180/53.1; 180/305; 180/306; 180/307; 74/15.84; 74/606 R
(58) Field of Classification Search ............... 74/606 R, 74/15.82, 15.86, 15.2, 15.4, 15.63, 15.84, 74/15.8; 180/344, 347, 364, 367, 53.1, 53.4, 180/305–307
See application file for complete search history.

(56) References Cited

U.S. PATENT DOCUMENTS 5,277,270 A * 1/1994 Hasegawa .................... 180/378

(Continued)

FOREIGN PATENT DOCUMENTS

JP 63-159134 7/1988

(Continued)

OTHER PUBLICATIONS

Notification of Transmittal of Translation of the International Preliminary Report on Patentability Chapter I or Chapter II of the Patent Cooperation Treaty, International Preliminary Report on Patentability and Written Opinion of the International Searching Authority, issued on Jan. 22, 2008, for PCT/JP2006/314141, 6 pages.

(Continued)

*Primary Examiner*—Ruth Ilan
(74) *Attorney, Agent, or Firm*—Sterne, Kessler, Goldstein & Fox P.L.L.C.

(57) ABSTRACT

A transmission includes a transmission case accommodating a planetary gear mechanism, a traveling speed change mechanism, a differential gear mechanism and a PTO clutch mechanism, and supporting an HST. The HST is connected to a first end wall of the transmission case positioned on one side in a vehicle longitudinal direction in a state that its HST output shaft is positioned its HST input shaft. A plurality of traveling rotational shafts forming a traveling transmission path are positioned coaxially with the HST output shaft, or on a first side of the HST output shaft in a vehicle width direction and below the HST output shaft. A plurality of PTO rotational shafts forming the PTO transmission path are positioned coaxially with or below the HST input shaft.

9 Claims, 15 Drawing Sheets

U.S. PATENT DOCUMENTS

| | | | |
|---|---|---|---|
| 6,830,116 B2 * | 12/2004 | Ishimaru et al. | 180/53.4 |
| 6,918,850 B2 * | 7/2005 | Hasegawa et al. | 475/72 |
| 7,370,714 B2 * | 5/2008 | Yasuda et al. | 180/53.4 |
| 7,520,346 B2 * | 4/2009 | Tate et al. | 180/6.48 |
| 2002/0014358 A1 * | 2/2002 | Osuga et al. | 180/53.6 |
| 2005/0150316 A1 * | 7/2005 | Ishii et al. | 74/11 |
| 2007/0163817 A1 * | 7/2007 | Ohashi et al. | 180/53.4 |

FOREIGN PATENT DOCUMENTS

| | | |
|---|---|---|
| JP | 9-66749 | 3/1997 |
| JP | 11-334394 | 12/1999 |
| JP | 2002-96650 | 4/2002 |
| JP | 2003-80961 | 3/2003 |
| JP | 2003-207021 | 7/2003 |
| JP | 2004-11714 | 1/2004 |
| JP | 2005-132368 | 5/2005 |

OTHER PUBLICATIONS

Patent Abstracts of Japan, English language abstract for Publication No. JP 2004-011714, Running Vehicle for Working, published Jan. 15, 2004.

Patent Abstracts of Japan, English language abstract for Publication No. JP 63-159134, Transmission of Self-Running Working Vehicle, published Jul. 2, 1988.

Patent Abstracts of Japan, English language abstract for Publication No. JP 2003-080961, Work Vehicle, published Mar. 19, 2003.

Patent Abstracts of Japan, English language abstract for Publication No. JP 2002-096650, Transmission for Tractor, published Apr. 2, 2002.

Patent Abstracts of Japan, English language abstract for Publication No. JP 2005-132368, Transmission for Working Vehicle, published May 26, 2005.

Patent Abstracts of Japan, English language abstract for Publication No. JP 11-334394, Transmission Device for Tractor, published Dec. 7, 1999.

Patent Abstracts of Japan, English language abstract for Publication No. JP 09-066749, Hydraulic Circuit Structure of Working Vehicle, published Mar. 11, 1997.

International Search Report for International Application No. PCT/JP2006/314141, mailed Oct. 17, 2006, 2 pgs.

Patent Abstracts of Japan, English language abstract for Publication No. JP 2003-207021, Working Vehicle, published Jul. 25, 2003.

* cited by examiner

TRANSMISSION

FIELD OF THE INVENTION

The present invention relates to a transmission applied to a working vehicle such as a tractor.

BACKGROUND ART

A transmission of a vehicle, which has a traveling transmission path for transmitting power from a driving power source to a pair of left and right main driving wheels and a PTO transmission path for transmitting power from the driving power source to a PTO shaft, has been conventionally known.

For example, a prior document 1 mentioned below discloses a transmission in which the traveling transmission path is formed by an HST operatively connected to the driving power source, a planetary gear mechanism respectively receiving constant-speed rotational power and variable-speed rotational power from a pump shaft and a motor shaft of the HST, a traveling gear speed change mechanism receiving a rotational power output from the planetary gear mechanism and a differential gear mechanism disposed on a downstream side of the traveling gear speed change mechanism in a power-power-transmitting direction.

The transmission is effective in terms of transmission efficiency because a part of the power transmitted through the traveling transmission path is not converted to hydraulic pressure.

However, the transmission leaves a room for improvement with respect to compact arrangement of the traveling transmission mechanism and the PTO transmission mechanism.

A prior document 2 discloses a transmission including a transmission case, an HST connected to a front surface of the transmission case, and a traveling gear speed change mechanism, a differential gear mechanism, a PTO clutch mechanism and a PTO gear speed change mechanism that are disposed in the transmission case, the transmission having a traveling transmission path for transmitting power from an output shaft of the HST to a pair of main driving wheels via the traveling gear speed change mechanism and the differential gear mechanism, and a PTO transmission path for transmitting power from an input shaft of the HST to a PTO shaft via the PTO clutch mechanism and the PTO gear speed change mechanism.

The conventional transmission is configured to respectively arrange the traveling transmission path and the PTO transmission path on left and right sides in a front view in order to prevent the transmission paths from being interfered with each other. However, the transmission leaves a room for improvement with respect to downsizing of the transmission as a whole.

In other words, in the above conventional transmission, the PTO transmission path is formed by the HST input shaft disposed vertically above the HST output shaft, a PTO speed change shaft disposed on a lower and a right side of the HST input shaft in a front view, an interlocking shaft and a mid PTO shaft disposed in order below the PTO speed change shaft, and a rear PTO shaft disposed above the PTO speed change shaft. This arrangement causes a problem that the overall transmission becomes large, especially in a vertical direction.

Further, the traveling transmission path in the above conventional transmission includes the HST output shaft disposed vertically below the HST input shaft, a traveling speed change shaft disposed on a upper side and a left side of the HST output shaft in a front view, a reduction gear for reducing speed of rotational power of the traveling speed change shaft and transmitting it to the differential gear mechanism, a traveling transmission shaft disposed below the traveling speed change shaft, and a front-wheel driving shaft disposed on a left side of the traveling speed change shaft in a front view. However, the arrangement causes a dead space on an upper side of the traveling speed change shaft and on a left side of the HST input shaft in a front view. As a result, the transmission is not enough in terms of downsizing.

In consideration of the conventional arts, it is an object of a first aspect of the present invention to provide a transmission of a vehicle, which includes a traveling transmission path for transmitting power from a driving power source to a pair of left and right main driving wheels via an HST, a traveling gear speed change mechanism and a differential gear mechanism, and a PTO transmission path for outputting power from the driving power source outside via a PTO clutch mechanism, the transmission being capable of accommodating transmission mechanisms forming the traveling transmission path and the PTO transmission path in a compact manner.

Moreover, the prior document 2 proposes a transmission including the transmission case, the HST connected to one end surface of the transmission case, and the traveling transmission mechanism and the PTO transmission mechanism positioned on a downstream side of the HST and accommodated in the transmission case, the transmission being capable of drawing oil stored in the transmission case through a suction filter provided at the one end surface of the transmission case.

The oil stored in the transmission case can be utilized as an oil source of charge oil for the HST forming a part of the traveling transmission mechanism, for example. Therefore, a separate oil tank can be eliminated or reduced in size.

Incidentally, the transmission including the traveling transmission mechanism and the PTO transmission mechanism as described above may be provided with a sub-traveling output shaft and a sub-PTO shaft in addition to a main traveling output shaft and a main PTO shaft according to its specification.

With regard to this point, the prior document 2 discloses a configuration in which a front-wheel power takeoff shaft functioning as the-sub traveling output shaft and a mid PTO shaft functioning as the sub-PTO shaft are provided at the one end surface of the transmission case to which the HST is connected.

As described above, although there is proposed the configuration that the HST, the sub-starveling output shaft, the sub-PTO shaft and the suction filter are provided at the same wall surface of the transmission case, no consideration is given to efficient arrangement of them.

Specifically, if the HST, the sub-traveling output shaft, the sub-PTO shaft and the suction filter are provided at the same wall surface of the transmission case, it is needed to take into consideration interference between transmission shafts and a conduit that are connected thereto. However, this viewpoint is not sufficiently taken into consideration in the prior art.

In consideration of the conventional part, it is an object of a second aspect of the present invention to provide a transmission of a vehicle, which includes a traveling transmission mechanism having an HST, a PTO transmission mechanism having a PTO clutch mechanism, and a transmission case that is capable of storing oil therein and that has one end wall to which the HST, a sub-traveling output shaft, a sub-PTO shaft and a suction filter are provided, the transmission allowing transmission shafts connected to the HST, the sub-traveling output shaft and the sub-PTO shaft and a conduit connected to the suction filter to be arranged without difficulty while preventing the transmission case from being enlarged.

Furthermore, the transmission described in the prior document 1 includes, in addition to the traveling transmission mechanism and the PTO transmission mechanism, an auxiliary pump transmission mechanism for transmitting the power from the driving power source to an auxiliary pump main body.

To put it more specifically, he conventional transmission is configured so that the HST is connected to a front wall of the transmission case and power transmission to the auxiliary pump main body supported at a rear wall of the transmission case is performed through an auxiliary pump transmission shaft disposed coaxially with a pump shaft of the HST.

In the conventional transmission, the auxiliary pump transmission shaft and various PTO rotational shafts forming the PTO transmission mechanism extend above a pair of differential output shafts in the differential gear mechanism and in a longitudinal direction of the vehicle.

Therefore, in order to avoid interference between the auxiliary pump transmission shaft and the PTO rotational shafts with the differential gear mechanism, it is needed that the HST and the differential gear mechanism are displaced in a width direction of the vehicle, resulting in enlargement of the transmission case in the width direction of the vehicle.

In consideration of the above conventional art, it is an object of a third aspect of the present invention to provide a transmission of a vehicle, which includes an HST, a traveling gear speed change mechanism, a differential gear mechanism, a PTO clutch mechanism, an auxiliary pump unit, and a transmission case which accommodates the traveling gear speed change mechanism, a differential gear mechanism and a PTO clutch mechanism, the transmission case including a first end wall which is positioned on one side in a longitudinal direction of the vehicle and to which the HST is connected and a second end which is positioned on the other side in the longitudinal direction of the vehicle, to which the auxiliary pump unit is connected and from which a main PTO shaft is extended outward, the transmission being capable of effectively arranging a transmission shaft along the vehicle longitudinal direction so as to be astride the differential gear mechanism to thereby downsize the transmission case as much as possible.

The transmission described in the prior document 1 also leaves a room for improvement with respect to compact arrangement of the traveling transmission mechanism and the PTO transmission mechanism.

Specifically, in the conventional transmission, the HST is disposed on one side of the differential gear mechanism in the longitudinal direction of the vehicle and power transmission to the differential gear mechanism is performed from the other side in the longitudinal direction of the vehicle.

The arrangement causes a plurality of traveling rotational shafts and PTO rotational shafts to extend in the longitudinal direction of the vehicle above the differential gear mechanism. As a result, it becomes difficult to install a brake operating shaft and a differential lock operating shaft, which are disposed to be along the width direction of the vehicle.

In consideration of the conventional art, it is an object of a fourth aspect of the present invention to provide a transmission that includes a traveling transmission mechanism having an HST, a planetary gear mechanism, a traveling gear speed change mechanism and a differential gear mechanism, and a PTO transmission mechanism having a PTO clutch mechanism, the transmission being capable of securing a free space as large as possible above the differential gear mechanism without enlarging a transmission case.

It is desired that the transmission having the traveling transmission mechanism and the PTO transmission mechanism as described in the prior document 1 is adaptable to various specifications according to the type of usage.

Specifically, it is desired that the transmission is adaptable to, for example, one specification having the sub-PTO shaft in addition to the main PTO shaft and another a specification in which a rotational direction of the main PTO shaft can be changed while using common components as much as possible.

However, there is no transmission made in consideration of such viewpoints.

In consideration of the above conventional art, it is an object of a fifth aspect of the present invention to provide a transmission of a vehicle, which includes a traveling transmission path for transmitting power from a driving power source to a pair of left and right main driving wheels via an HST, a traveling gear speed change mechanism and a differential gear mechanism, and a PTO transmission path for outputting power from the driving power source outside from a main PTO shaft via a PTO clutch mechanism, the transmission being capable of easily changing one specification in which power output to the outsides could be performed a sub-PTO shaft in addition to the main PTO shaft to/from another specification in which a rotational direction of the main PTO shaft could be changed.

Prior document 1: Japanese Patent Application Laid-open No. 2003-207021

Prior document 2: Japanese Patent No. 3636594

DISCLOSURE OF THE INVENTION

The first aspect of the present invention provides, in order to achieve the object, a transmission of a vehicle including a traveling transmission path in which driving power is transmitted from an driving power source to a pair of right and left main driving wheels through an HST, a traveling gear speed change mechanism and a differential gear mechanism, and a PTO transmission path in which driving power transmitted from the driving power source is output outside through a PTO clutch mechanism, the transmission including a transmission case accommodating the traveling gear speed change mechanism, the differential gear mechanism and the PTO clutch mechanism, and supporting the HST, wherein the HST is supported on a first end wall of the transmission case positioned on one side in a vehicle longitudinal direction in a state that an HST output shaft is positioned above an HST input shaft, a plurality of traveling rotational shafts forming the traveling transmission path and disposed along the vehicle longitudinal direction are positioned coaxially with the HST output shaft, or on a first side of the HST output shaft in a vehicle width direction and below the HST output shaft, and a plurality of PTO rotational shafts forming the PTO transmission path and disposed along the vehicle longitudinal direction are positioned coaxially with or below the HST input shaft.

According to the configuration, it is possible to achieve an effective arrange in which the traveling gear speed change mechanism and the differential gear mechanism forming the traveling transmission path are put together in one space within the transmission case and in which the PTO clutch mechanism forming the PTO transmission path is put together in another space within the transmission case, thereby compacting the transmission case.

In one embodiment, the transmission may further include a planetary gear mechanism accommodated in the transmission case and disposed between the HST and the traveling gear speed change mechanism so as to form a part of the traveling transmission path.

In a first embodiment, the traveling rotational shafts may include a planetary output shaft operatively connected to an output portion of the planetary gear mechanism that combines rotational power of the HST output shaft and the HST input shaft, the planetary output shaft being positioned coaxially with the HST output shaft, a traveling transmission shaft displaced from the planetary output shaft to the first side in the vehicle width direction, and a traveling speed change shaft operatively connected to the traveling transmission shaft through the traveling gear speed change mechanism and transmitting rotational power to an input ring gear of the differential gear mechanism, the traveling speed change shaft being positioned below the traveling transmission shaft so as to be positioned substantially at the same height as a pair of differential output shafts of the differential gear mechanism.

The PTO rotational shafts may include a PTO input shaft positioned coaxially with and relatively non-rotatable around its axis line to the HST input shaft, a PTO clutch shaft operatively connected to the PTO input shaft through the PTO clutch mechanism and positioned below the PTO input shaft and on a second side of the PTO input shaft in the vehicle width direction, the second side being opposite to the first side in the vehicle width direction, a main PTO transmission shaft operatively connected to the PTO clutch shaft and positioned below and on the first side of the PTO clutch shaft in the vehicle width direction, and a main PTO shaft operatively connected to the main PTO transmission shaft and supported by a second end wall of the transmission case positioned on a side opposite to the first end wall in the vehicle longitudinal direction so as to extend outward from the second end wall.

The main PTO transmission shaft extends along the vehicle longitudinal direction at a position below the pair of differential output shafts.

In a second embodiment, the transmission may further include a planetary gear mechanism accommodated in the transmission case and disposed between the HST and the traveling gear speed change mechanism so as to form a part of the traveling transmission path, and a PTO gear speed change mechanism accommodated in the transmission case and forming a part of the PTO transmission path.

In the second embodiment, the traveling rotational shafts may include a planetary output shaft operatively connected to an output portion of the planetary gear mechanism that combines rotational power of the HST output shaft and the HST input shaft, the planetary output shaft being positioned coaxially with the HST output shaft, a traveling transmission shaft displaced from the planetary output shaft to the first side in the vehicle width direction, and a traveling speed change shaft operatively connected to the traveling transmission shaft through the traveling gear speed change mechanism and transmitting rotational power to an input ring gear of the differential gear mechanism, the traveling speed change shaft being positioned below the traveling transmission shaft so as to be positioned substantially at the same height as a pair of differential output shafts of the differential gear mechanism.

The PTO rotational shafts may include a PTO input shaft positioned coaxially with and relatively non-rotatable around its axis line to the HST input shaft, a PTO clutch shaft operatively connected to the PTO input shaft through the PTO clutch mechanism and positioned below and on a second side of the PTO input shaft in the vehicle width direction, the second side being opposite to the first side in the vehicle width direction, a PTO speed change shaft operatively connected to the PTO clutch shaft through the PTO gear speed change mechanism and positioned below and on the first side of the PTO clutch shaft in the vehicle width direction, and a main PTO shaft operatively connected to the PTO speed change shaft and supported by a second end wall of the transmission case positioned on a side opposite to the first end wall in the vehicle longitudinal direction so as to extend outward from the second end wall.

The PTO speed change shaft is positioned below the pair of differential output shafts of the differential gear mechanism, and the main PTO shaft is operatively connected to the PTO speed change shaft through a main PTO transmission shaft, which is positioned coaxially with and connected in a relatively non-rotatable manner around its axis line to the PTO speed change shaft and which passes over the pair of differential output shafts below the output shafts.

In the second embodiment, the traveling rotational shafts may include a sub-traveling output shaft operatively connected to and positioned below the traveling speed change shaft, the sub-traveling output shaft extending outward from the first end wall.

For example, the PTO rotational shafts may include a PTO idle shaft positioned below the PTO clutch shaft and on the second side of the PTO speed change shaft in the vehicle width direction so as to be operatively connected to both the PTO clutch shaft and the PTO speed change shaft.

The sub-traveling output shaft is positioned lowest among the traveling rotational shafts.

Alternatively, the PTO rotational shafts may include a sub-PTO shaft positioned on the second side of the PTO speed change shaft in the vehicle width direction and operatively connected to the PTO speed change shaft, the sub-PTO shaft extending outward from the first end wall.

In the alternative configuration, the sub-traveling output shaft is positioned lowest among the traveling rotational shafts, and the sub-PTO shaft is positioned lowest among the PTO rotational shafts.

The second aspect of the present invention provides, in order to achieve the object, a transmission with a transmission case having a first end wall to which an HST and a suction filter are connected and from which a sub-traveling output shaft and a sub-PTO shaft extend outward, wherein the suction filter is connected to the first end wall so as to be positioned between the sub-traveling output shaft and the sub-PTO shaft with respect to a vehicle width direction so that at least a part of the suction filter overlaps the HST in a plan view and so as to be positioned below the HST with respect to a vertical direction so that at least a part of the suction filter overlaps the sub-traveling output shaft and the sub-PTO shaft in a side view.

According to the configuration, it is possible to arrange transmission shafts connected to the HST, the sub-traveling output shaft and the sub-PTO shaft, and a conduit connected to the suction filter without difficulty while preventing the transmission case from being enlarged.

The second aspect of the present invention also provides, in order to achieve the object, a transmission of a vehicle including a traveling transmission path in which driving power is transmitted from an driving power source to a pair of right and left main driving wheels through an HST, a planetary gear mechanism, a traveling gear speed change mechanism and a differential gear mechanism, and a PTO transmission path in which driving power transmitted through a PTO clutch mechanism from the driving power source is output outside; the planetary gear mechanism, the traveling gear speed change mechanism, the differential gear mechanism and the PTO clutch mechanism being accommodated in a transmission case that is capable of storing oil; the HST being supported on an outer surface of a first end wall of the transmission case positioned on one side in a vehicle longitudinal direction; and the transmission being capable of drawing oil stored in the transmission case through a suction filter. Traveling rotational shafts extending along the vehicle longitudinal direction and forming the traveling transmission path include a planetary output shaft operatively connected to an output portion of the planetary gear mechanism that combines rotational power of the HST output shaft and the HST input shaft, the planetary output shaft being positioned coaxially with the HST output shaft, a traveling transmission shaft displaced from the planetary output shaft to a first side in a vehicle width direction, a traveling speed change shaft positioned below the traveling transmission shaft and transmitting rotational power, which is transmitted from the traveling transmission shaft in a state that its rotational speed has been changed by the traveling gear speed change mechanism, to an input ring gear of the differential gear mechanism, and a sub-traveling output shaft positioned below the traveling speed change shaft and operatively connected to the traveling speed change shaft, the sub-traveling output shaft extending outward from the first end wall. PTO rotational shafts extending along the vehicle longitudinal direction and forming the PTO transmission path include a PTO input shaft positioned coaxially with and relatively non-rotatable around its axis line to the HST input shaft, a PTO clutch shaft operatively connected to the PTO input shaft through the PTO clutch mechanism and positioned below and on a second side of the PTO input shaft in the vehicle width direction, the second side being opposite to the first side in the vehicle width direction, a main PTO transmission shaft operatively connected to and positioned below the PTO clutch shaft, a main PTO shaft operatively connected to the main PTO transmission shaft and supported by a second end wall of the transmission case positioned on a side opposite to the first end wall in the vehicle longitudinal direction so as to extend outward from the second end wall, and a sub-PTO shaft operatively connected to the main PTO transmission shaft and extending outward from the first end wall. The suction filter is connected to the first end wall so as to be positioned between the sub-traveling output shaft and the sub-PTO shaft with respect to the vehicle width direction so that at least a part of the suction filter overlaps the HST in a plan view and so as to be positioned below the HST with respect to a vertical direction so that at least a part of the suction filter overlaps the sub-traveling output shaft and the sub-PTO shaft in a side view.

In one embodiment, the transmission may further include a PTO gear speed change mechanism accommodated in the transmission case and forming a part of the PTO transmission path.

In the one embodiment, the PTO rotational shafts further include a PTO speed change shaft transmitting rotational power, which is transmitted through the PTO gear speed change mechanism from the PTO clutch shaft, to the main PTO transmission shaft, the PTO speed change shaft being positioned coaxially with the main PTO transmission shaft. The sub-PTO shaft is operatively connected to the PTO speed change shaft.

Preferably, the HST is connected to the first end wall in a state that the HST output shaft is positioned above the HST input shaft.

The transmission may further include an auxiliary pump unit suctioning oil stored in the transmission case through the suction filter, the auxiliary pump unit being connected to the second end wall of the transmission case positioned on a side opposite to the first end wall in the vehicle longitudinal direction and rotationally driven through an auxiliary pump transmission shaft operatively connected to the PTO input shaft.

In the configuration, the auxiliary pump transmission shaft and the main PTO transmission shaft are arranged in such a manner that one shaft and the other shaft are respectively positioned above and below with a pair of differential output shafts of the differential gear mechanism as a reference.

The third aspect of the present invention provides, in order to achieve the object, a transmission of a vehicle including an HST, a traveling gear speed change mechanism, a differential gear mechanism, a PTO clutch mechanism, a transmission case and an auxiliary pump unit; the traveling gear speed change mechanism, the differential gear mechanism and the PTO clutch mechanism being accommodated in the transmission case; the transmission case having a first end wall which is positioned on one side in a vehicle longitudinal direction and to which the HST is connected, and a second end wall which is positioned on the other side in the vehicle longitudinal direction, to which the auxiliary pump unit is connected and from which a main PTO shaft extends outward, wherein the differential gear mechanism includes a pair of differential output shafts operatively and respectively connected to a pair of driving axles through reduction gear trains, the pair of driving axles being positioned below the pair of differential output shafts, a main PTO transmission shaft for transmitting rotational power toward the main PTO shaft is provided so as to extend in the vehicle longitudinal direction at a position below the pair of differential output shaft while utilizing a space between the pair of driving axles, and an auxiliary pump transmission shaft for transmitting rotational power toward the auxiliary pump unit is provided so as to extend along the vehicle longitudinal direction at a position above the pair of differential output shafts.

According to the configuration, it is possible to downsize the transmission case as much as possible.

The third aspect of the present invention also provides, in order to achieve the object, A transmission of a vehicle including an HST having an HST input shaft and an HST output shaft, a transmission case having a first end wall, an intermediate wall and a second end wall that are arranged in this order from one side to the other side in a vehicle longitudinal direction and that extend substantially vertically, the HST being connected to an outer surface of the first end wall, a planetary gear mechanism, a traveling gear speed change mechanism and a PTO clutch mechanism accommodated in a first space defined by the first end wall and the intermediate wall out of an inner space of the transmission case, a differential gear mechanism accommodated in a second space defined by the intermediate wall and the second end wall out of the inner space of the transmission case, a pair of driving axles operatively and respectively connected to a pair of differential output shafts of the differential gear mechanism through reduction gear trains so as to be positioned below the differential output shafts, a planetary output shaft operatively connected to an output portion of the planetary gear mechanism that combines rotational power of the HST output shaft and the HST input shaft, the planetary output shaft being supported by the intermediate shaft so as to be positioned coaxially with the HST output shaft, a traveling transmission shaft supported by the first end wall and the intermediate wall so as to be positioned on a first side of the planetary output shaft in a vehicle width direction, a traveling speed change shaft operatively connected to the traveling transmission shaft through the traveling gear speed change mechanism and outputting rotational power to an input ring gear of the differential gear mechanism, the traveling speed change shaft being supported by the first end wall and the intermediate shaft so as to be positioned below the traveling transmission shaft, a PTO input shaft positioned coaxially with and connected in a relatively non-rotatable manner around its axis line to the HST input shaft, a PTO clutch shaft operatively connected to the PTO input shaft through the PTO clutch mechanism, the PTO clutch shaft being supported by the first end wall and the intermediate shaft so as to be positioned below and on a second side of the PTO input shaft in the vehicle width direction, the second side being opposite to the first side in the vehicle width direction, a main PTO transmission shaft operatively connected to the PTO clutch shaft and extending along the vehicle longitudinal direction at a position below and on the first side of the PTO clutch shaft in the vehicle width direction, a main PTO shaft operatively connected to the main PTO transmission shaft and having an end on a downstream side in a power-transmission direction, the end extending outward from the second end wall, an auxiliary pump transmission shaft supported by the intermediate wall and the second end wall so as to be positioned above the PTO clutch shaft and operatively connected to the PTO input shaft, and an auxiliary pump unit supported by the second end wall and operatively driven by the auxiliary pump transmission shaft, wherein the main PTO transmission shaft extends along the vehicle longitudinal direction at a position below the pair of differential output shafts while utilizing a space between the pair of driving axles, and the auxiliary pump transmission shaft extends along the vehicle longitudinal direction at a position above the pair of differential output shafts while utilizing a space existed on the second side in the vehicle width direction of a phantom vertical plane passing axis lines of the HST output shaft and the HST input shaft.

According to the configuration, it is possible to downsize the transmission case as much as possible.

In one embodiment, the transmission may further include a PTO gear speed change mechanism accommodated in the first space, and a PTO speed change shaft operatively connected to the PTO clutch shaft through the PTO gear speed change mechanism and supported by the first end wall and the intermediate wall so as to be positioned coaxially with and connected in a relatively non-rotatable manner around its axis line to the main PTO transmission shaft.

Preferably, the auxiliary pump transmission shaft is operatively connected to the PTO input shaft through a driving-side member of the PTO clutch mechanism supported on the PTO clutch shaft.

The fourth aspect of the present invention provides, in order to achieve the object, a transmission of a vehicle configured so that driving power is transmitted from a driving power source to a pair of right and left main driving wheels through a traveling transmission mechanism including an HST operatively connected to the driving power source, a planetary gear mechanism respectively receiving constant-speed driving power and variable-speed driving power from a pump shaft and a motor shaft of the HST, a traveling gear speed change mechanism receiving driving power output from the planetary gear mechanism and a differential gear mechanism positioned on a downstream side of the traveling gear speed change mechanism in a power-transmitting direction, and also configured so that driving power from the driving power source is output outside through a PTO transmission mechanism including a PTO clutch mechanism positioned on a downstream side of the pump shaft of the HST in the power-transmitting direction, the transmission includes a transmission case accommodating the planetary gear mechanism, the traveling gear speed change mechanism, the differential gear mechanism and the PTO clutch mechanism, wherein the HST is connected to a first end wall of the transmission case positioned on one side in a vehicle longitudinal direction, and the planetary gear mechanism, the traveling gear speed change mechanism and the PTO clutch mechanism are accommodated in the transmission case so as to be positioned between the first end wall and the differential gear mechanism with respect to the vehicle longitudinal direction.

The fourth aspect of the present invention with the configuration makes it possible to achieve an arrangement in which no traveling rotational shaft and no PTO rotational shaft are disposed above the differential gear mechanism to thereby secure a free space above the differential gear mechanism as large as possible.

Accordingly, it is possible to arrange a brake operation shaft and a differential lock operation shaft to be disposed along a vehicle width direction above the differential gear mechanism without difficulty, while downsizing the transmission case with respect to a vertical direction.

Preferably, the transmission case may include a peripheral wall, the first end wall extending substantially in a vertical direction at an end portion of the peripheral wall positioned on the one side in the vehicle longitudinal direction, a second end wall extending substantially in the vertical direction at an end portion of the peripheral wall positioned on the other side in the vehicle longitudinal direction, and an intermediate wall extending substantially in the vertical direction between the first and second end walls.

In the configuration, the planetary gear mechanism, the traveling gear speed change mechanism and the PTO clutch mechanism are accommodated in a first space defined by the first end wall and the intermediate wall. The differential gear mechanism is accommodated in a second space defined by the intermediate wall and the second end wall.

In one embodiment, the PTO transmission mechanism further includes a PTO gear speed change mechanism. The PTO gear speed change mechanism is accommodated in the first space.

In the various configurations, the transmission case may has a first portion including the first end wall, and a second portion including the intermediate wall and the second end wall.

The first and second portions are detachably connected to each other.

The fifth aspect of the present invention provides, in order to achieve the object, a transmission of a vehicle including an HST operatively connected to a driving power source; a transmission case having a first end wall, an intermediate wall and a second end wall that are arranged in this order from one side to the other side in a vehicle longitudinal direction and that extend substantially vertically, the first end wall supporting the HST; a traveling gear speed change mechanism and a PTO clutch mechanism accommodated in a first space out of an inner space of the transmission case defined by the first end wall and the intermediate wall; a differential gear mechanism accommodated in a second space out of the inner space of the transmission case defined by the intermediate wall and the second end wall; a PTO input shaft supported by the first end wall and the intermediate wall so as to be positioned coaxially with an input shaft of the HST; a PTO clutch shaft operatively connected to the PTO input shaft through the PTO clutch mechanism and supported by the first end wall and the intermediate wall so as to be positioned below and on a second side of the PTO input shaft in a vehicle width direction; a main PTO transmission shaft operatively connected to the PTO clutch shaft and extending along the vehicle longitudinal direction at a position below and on a first side of the PTO clutch shaft in the vehicle width direction, the first side being opposite to the second side in the vehicle width direction; a main PTO shaft operatively connected to the main PTO transmission shaft and supported by the second end wall so as to have an end positioned on a downstream side in a power-transmitting direction and extending outward from the second end wall, wherein the first end wall and the intermediate wall are configured so as to selectively support a PTO idle shaft for changing a rotational direction of rotational power transmitted form the PTO clutch shaft to the main PTO transmission shaft or a sub-PTO shaft for outputting rotational power of the main PTO transmission shaft outside from the first end wall, at a position below the PTO clutch shaft and on the second side of the main PTO transmission shaft in the vehicle width direction.

According to the configuration, it is possible to easily perform a specification change between one specification capable of outputting rotational power outside from the sub-PTO shaft in addition to the main PTO shaft and the other specification capable of changing over the rotational direction of the main PTO shaft, while utilizing common components inclusive the transmission case and as many as possible.

Preferably, the transmission may further include a planetary gear mechanism accommodated in the first space.

Preferably, the transmission may further include a PTO gear speed change mechanism accommodated in the first space, and a PTO speed change shaft operatively connected to the PTO clutch shaft through the PTO gear speed change mechanism and supported by the first end wall and the intermediate wall so as to be positioned coaxially with and relatively non-rotatable around its axis line to the main PTO transmission shaft.

In the configuration, the PTO idle shaft and the sub-PTO shaft to be selectively provided are arranged so as to operatively connect to both the PTO clutch shaft and the PTO speed change shaft.

Preferably, out of the first end wall, a portion selectively supporting the PTO idle shaft or the sub-PTO shaft is formed with an access opening allowing an access into the first space from outside.

Figure 1:
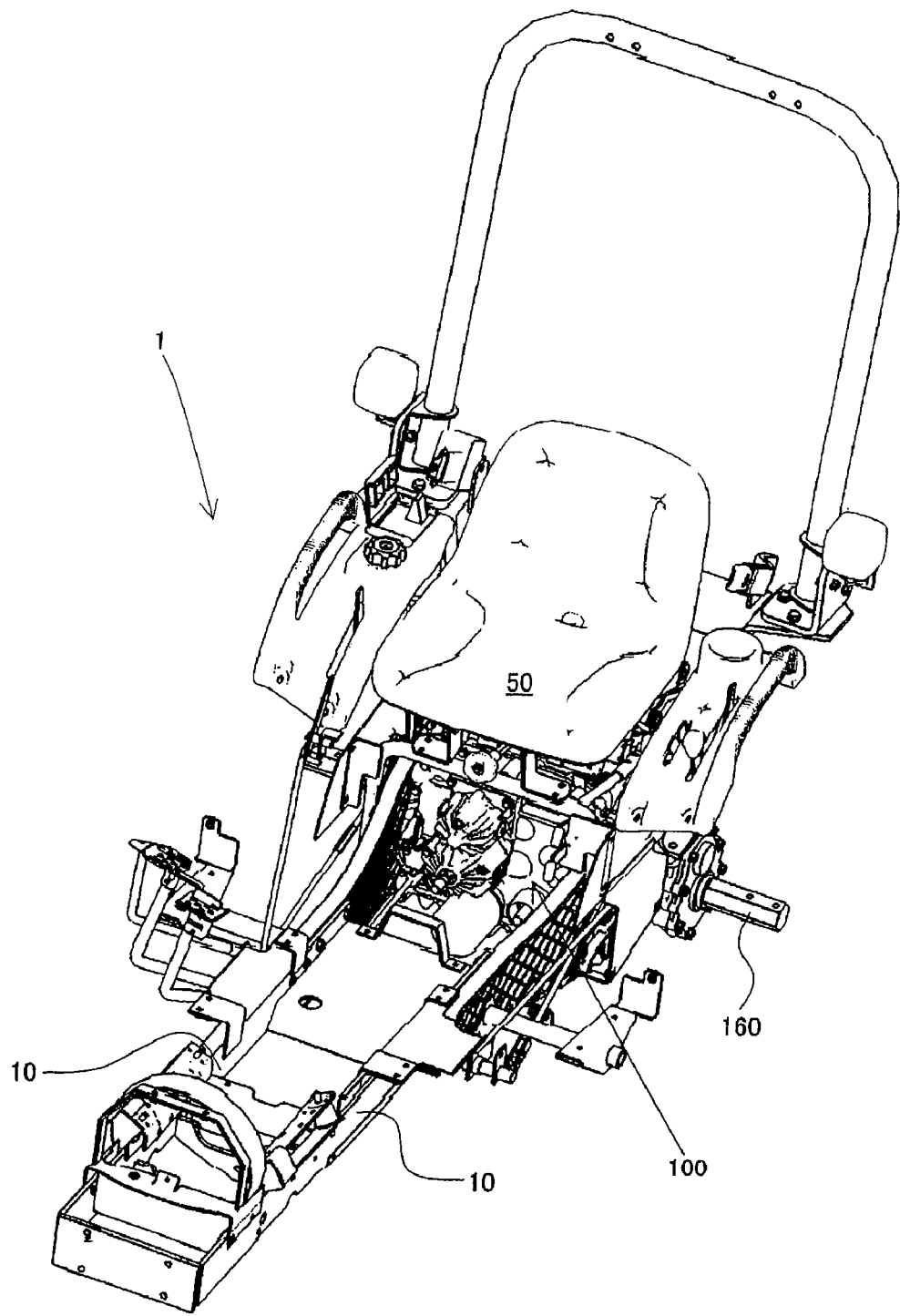
FIG. 1 is a partial perspective view of a working vehicle to which a transmission according to one embodiment of the present embodiment is applied.

DESCRIPTION OF THE REFERENCE NUMERALS 1 working vehicle
100 transmission
110 HST
111 HST input shaft (pump shaft)
113 HST output shaft (motor shaft)
120 planetary gear mechanism
130 traveling gear speed change mechanism
140 differential gear mechanism
142 differential output shaft
160 driving axle
170 reduction gear train
210 PTO clutch mechanism
220 PTO gear speed change mechanism
300 transmission case
300a first space
300b second space
301 first end wall
302 second end wall
303 intermediate wall
410 planetary output shaft
420 traveling transmission shaft
430 traveling output shaft
450 sub-traveling output shaft
510 PTO input shaft
520 PTO clutch shaft
530 PTO speed change shaft
540 main PTO shaft
550 PTO idle shaft
560 main PTO transmission shaft
570 sub-PTO shaft
600 auxiliary pump unit
620 suction filter
650 auxiliary pump transmission shaft

BEST MODE FOR CARRYING OUT THE INVENTION

A preferred embodiment of a transmission according to the present invention will be described below with reference to the accompanying drawings.

Figure 2:
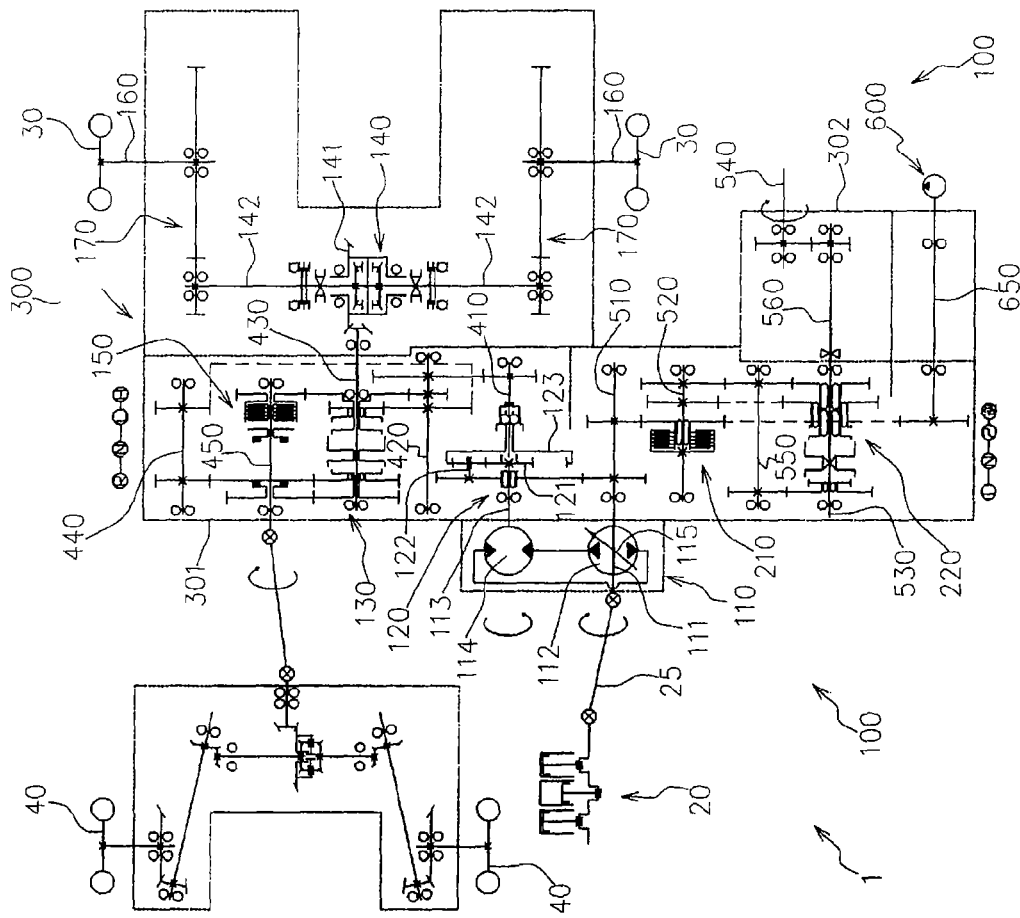
FIG. 2 is a transmission schematic diagram of the working vehicle shown in FIG. 1.

FIG. 1 is a partial perspective view of a working vehicle 1 to which the transmission 100 according to the present embodiment is applied. FIG. 2 is a transmission schematic diagram of the working vehicle 1.

As shown in FIGS. 1 and 2, the working vehicle 1 includes a vehicle frame 10 (see FIG. 1) extending in a longitudinal direction of the vehicle, a driving power source 20 (see FIG. 2) supported on one side (a front side in the present embodiment shown in the drawings) of the vehicle frame 10 in the longitudinal direction of the vehicle, and the transmission 100 supported on the other end side (a rear side in the present embodiment shown in the drawings) of the vehicle frame 10 in the longitudinal direction of the vehicle so as to be positioned away from the driving power source 20 in the longitudinal direction of the vehicle with a space.

The transmission 100 includes a traveling transmission mechanism for transmitting power inputted from the driving power source 20 via a transmission shaft 25 (see FIG. 2) to main driving wheels (rear wheels 30 in the present embodiment shown in the drawings) and a PTO transmission mechanism for outputting the driving power outside, which has been transmitted from the driving power source 20.

To put it specifically, the transmission 100 includes, as shown in FIG. 2, an HST 110 operatively connected to the driving power source 20, a planetary gear mechanism 120 disposed on a downstream side of the HST 110 in a power-transmitting direction, a traveling gear speed change mechanism 130 disposed on a downstream side of the planetary gear mechanism 120 in the power-transmitting direction, a differential gear mechanism 140 disposed on a downstream side of the traveling gear speed change mechanism 130 in the power-transmitting direction, a PTO clutch mechanism 210 disposed on a downstream side of the HST 110 in the power-transmitting direction, a PTO gear speed change mechanism 220 disposed on a downstream side of the PTO clutch mechanism 210 in the power-transmitting direction, and a main PTO shaft 540 operatively connected to the PTO gear speed change mechanism 220. The HST 110, the planetary gear mechanism 120, the traveling gear speed change mechanism 130 and the differential gear mechanism 140 form the traveling transmission mechanism. The PTO clutch mechanism 210 and the PTO gear speed change mechanism 220 form the PTO transmission mechanism.

Figure 3:
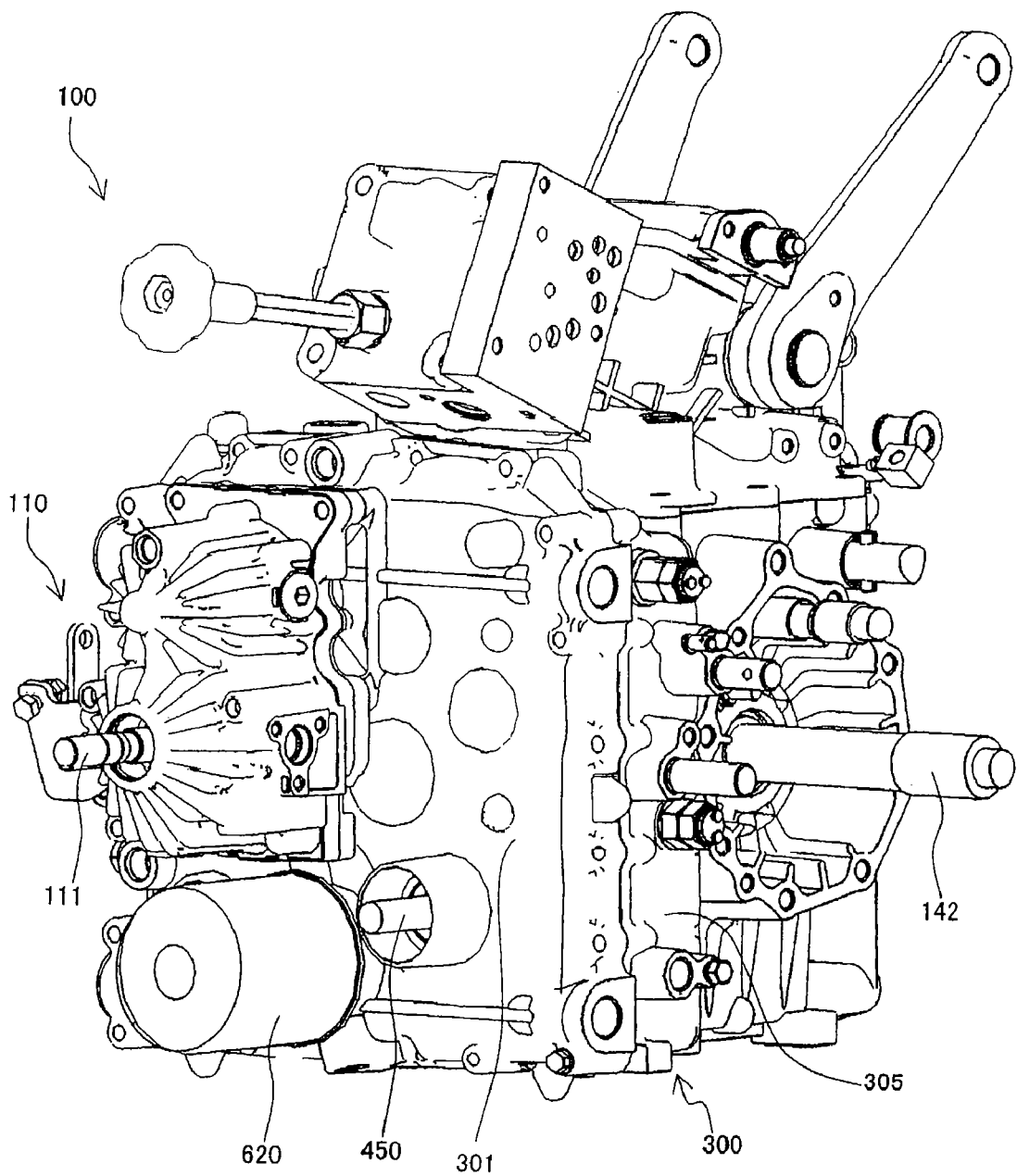
FIG. 3 is a perspective view of the transmission according to the one embodiment of the present invention.
Figure 4:
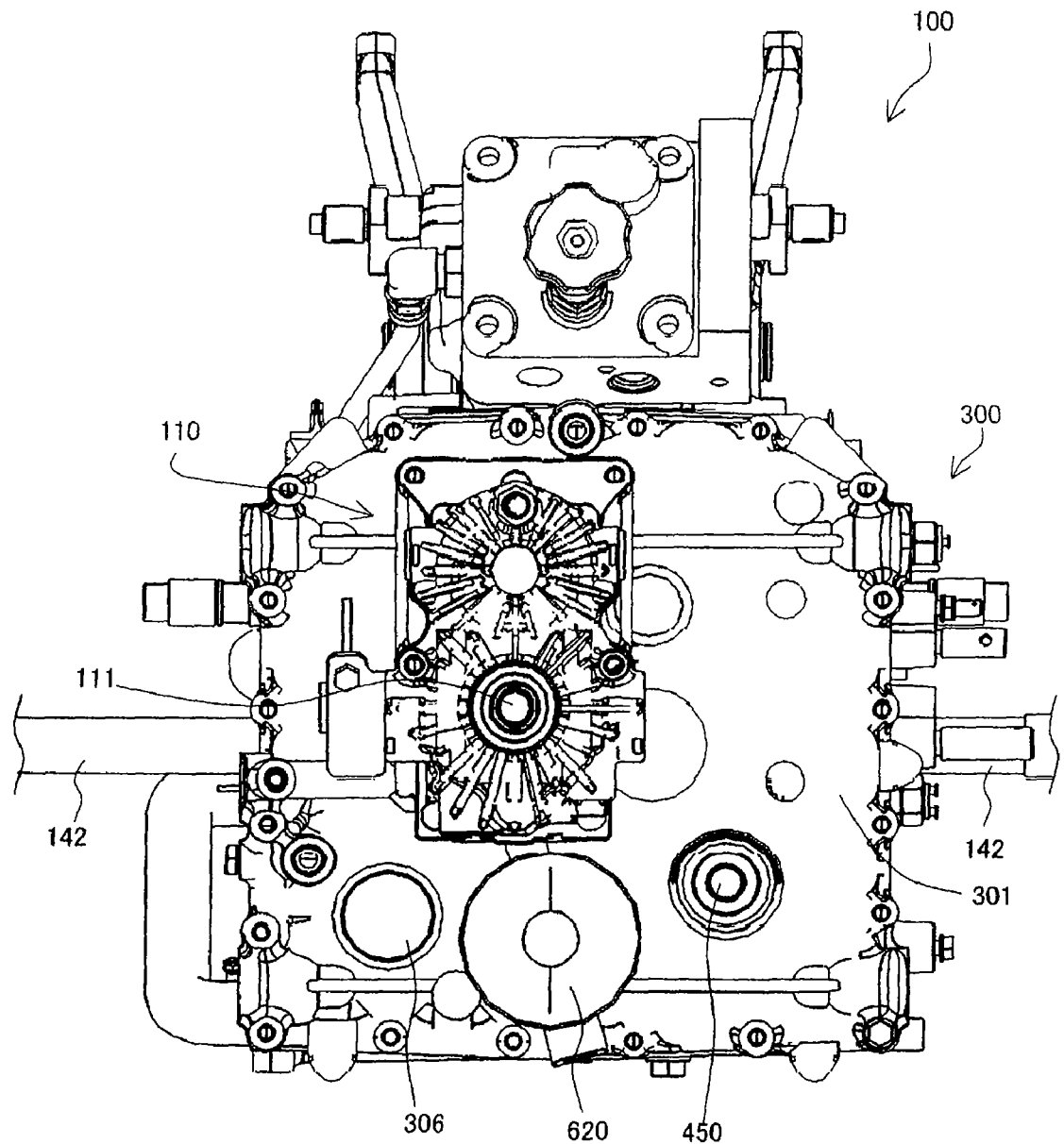
FIG. 4 is a front view of the transmission shown in FIG. 3.
Figure 5:
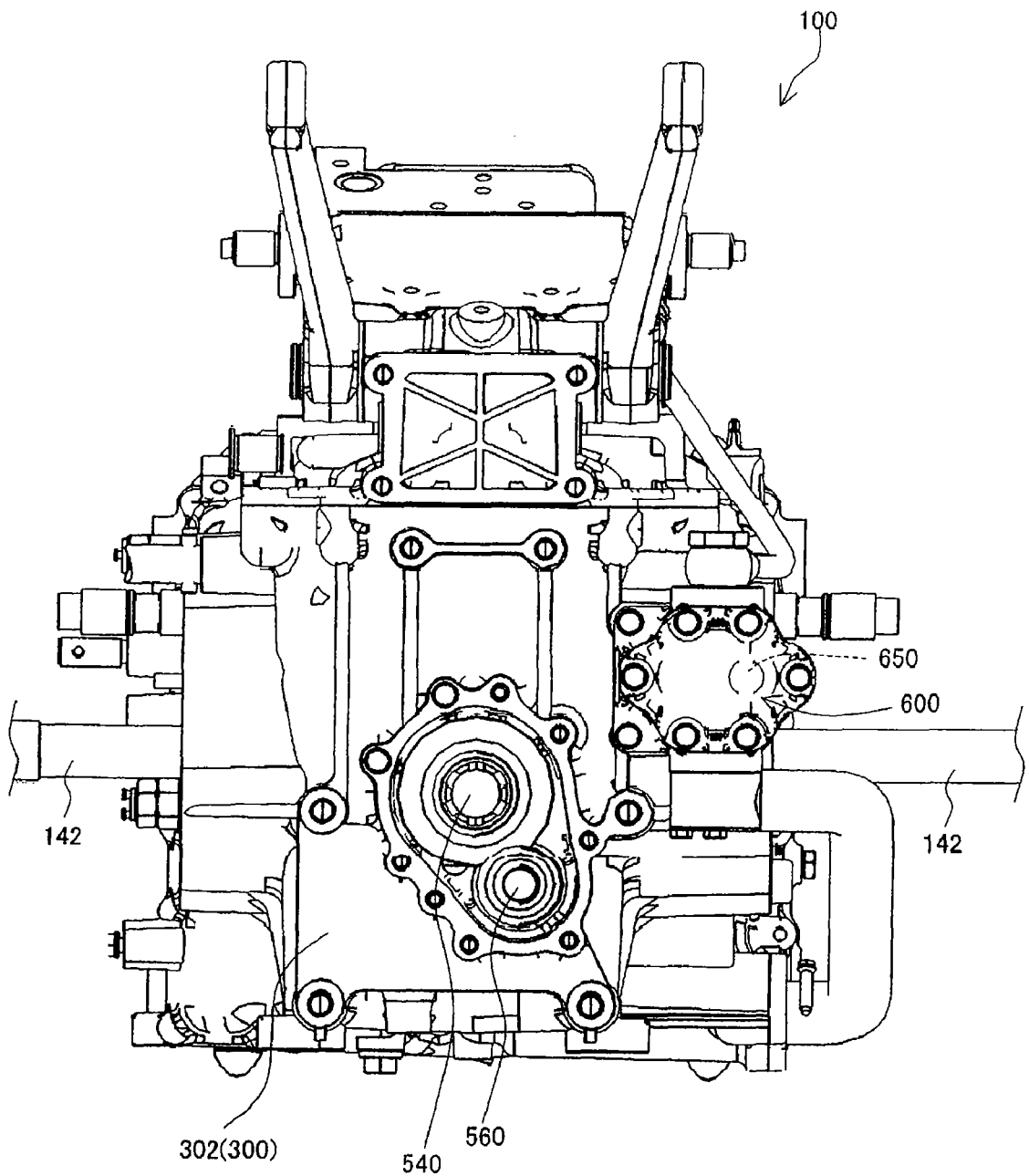
FIG. 5 is a rear view of the transmission shown in FIGS. 3 and 4.

FIGS. 3 to 5 are a perspective view, a front view, and a rear view of the transmission 100, respectively.

As shown in FIGS. 3 to 5, the transmission 100 includes, in addition to the above components, a transmission case 300 for supporting and accommodating the above various transmission mechanisms.

To put it specifically, the transmission case 300 accommodates the planetary gear mechanism 120, the traveling gear speed change mechanism 130, the differential gear mechanism 140, the PTO clutch mechanism 210 and the PTO gear speed change mechanism 220, and also supports the HST 110 on an outer surface of its first end wall 301 (a front wall in the present embodiment) positioned on one side of the transmission case 300 in the longitudinal direction of the vehicle.

Figure 6:
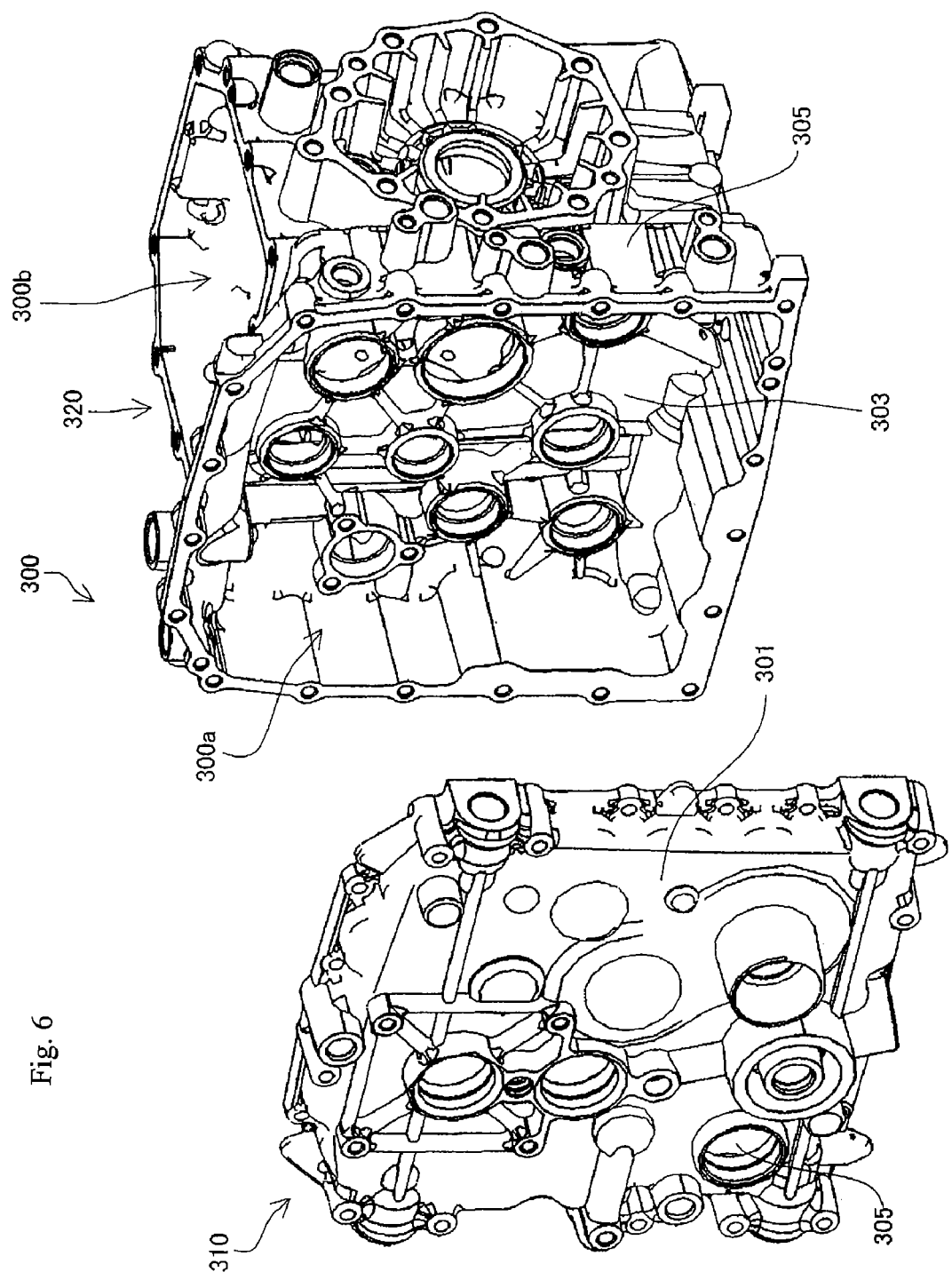
FIG. 6 is an exploded perspective view of a transmission case of the transmission shown in FIGS. 3 to 5.

FIG. 6 is an exploded perspective view of the transmission case 300.

Figure 7:
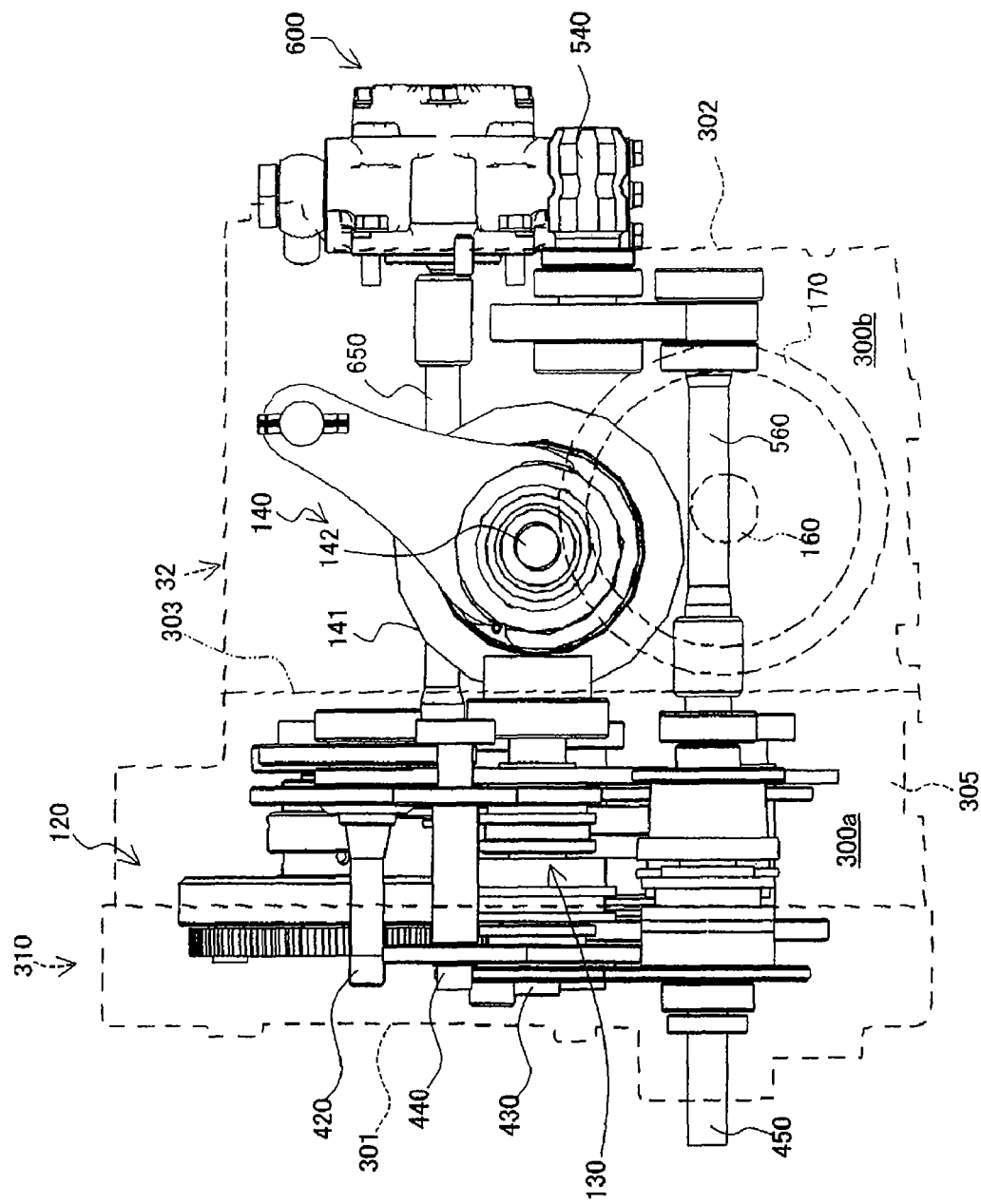
FIG. 7 is a left side view the transmission mechanisms in the transmission shown in FIGS. 3-5, with the transmission case being shown in a broken line.
Figure 8:
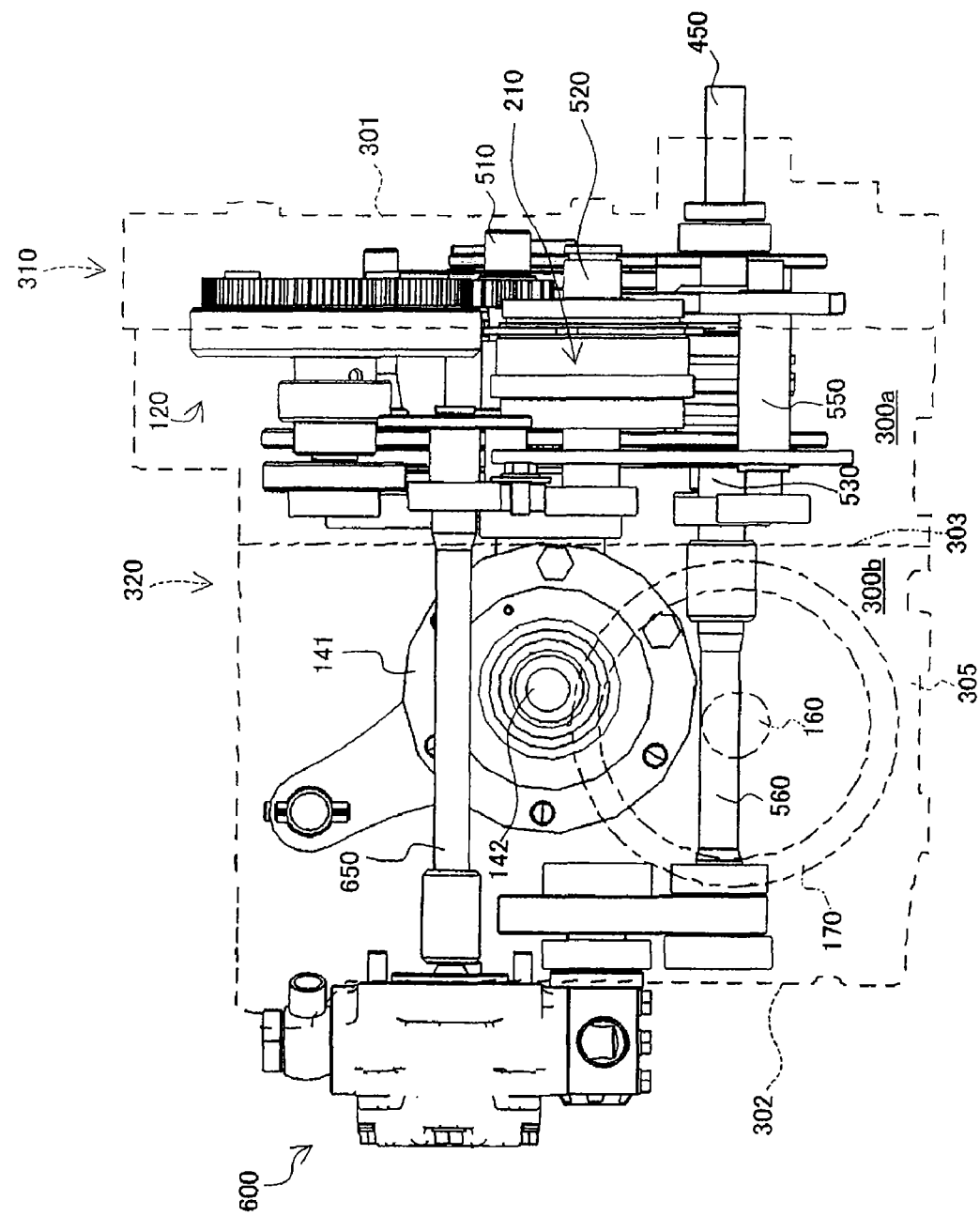
FIG. 8 is a right side view the transmission mechanisms in the transmission shown in FIGS. 3-5, with the transmission case being shown in a broken line.
Figure 9:
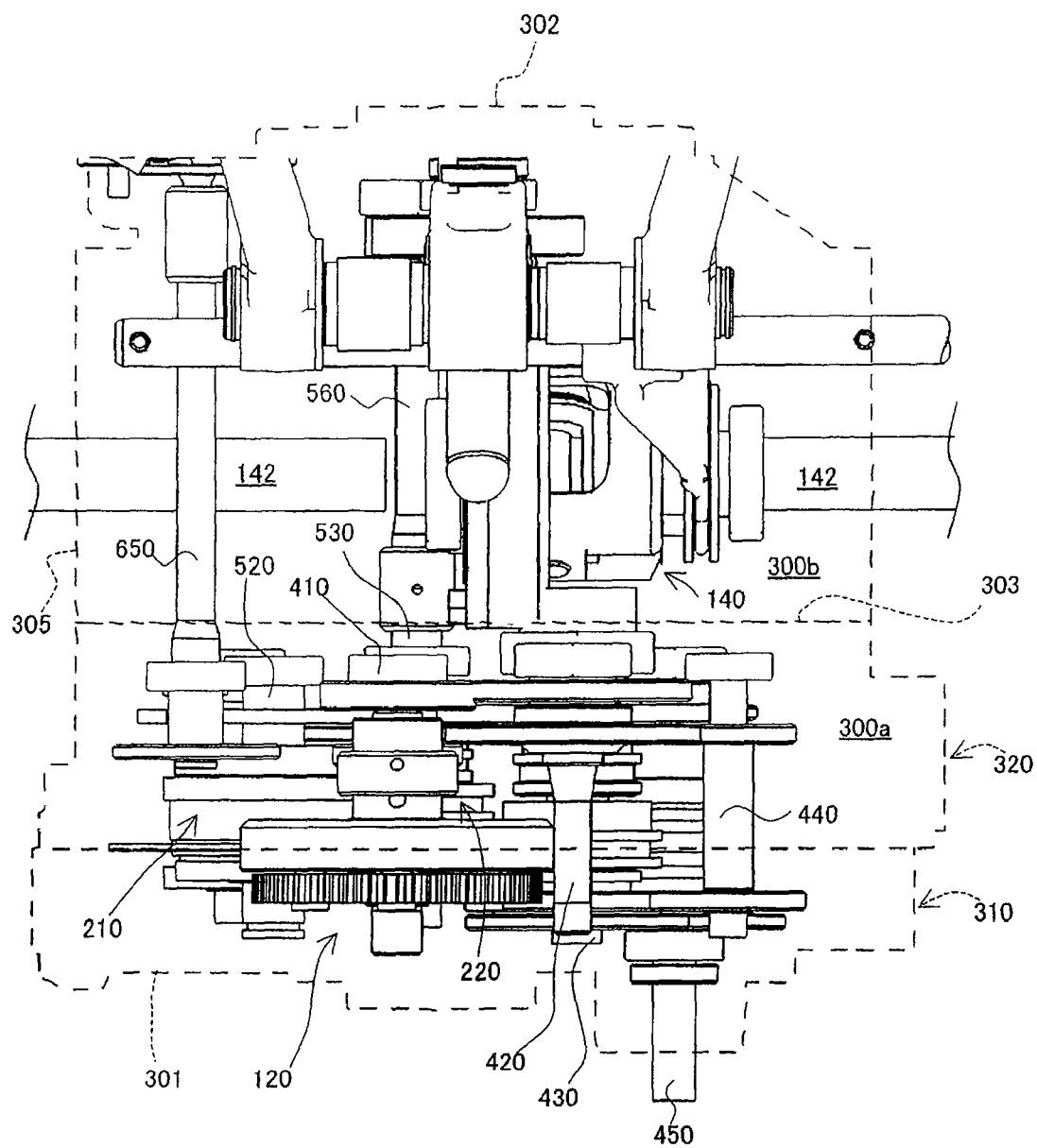
FIG. 9 is a plan view the transmission mechanisms in the transmission shown in FIGS. 3-5, with the transmission case being shown in a broken line.

FIGS. 7 to 9 are a left side view, a right side view, and a plan view of the transmission mechanisms in the transmission 100, respectively. In FIGS. 7 to 9, the transmission case 300 is shown in a broken line.

As shown in FIGS. 3 to 9, the transmission case 300 includes a peripheral wall 305, the first end wall 301 extending substantially in a vertical direction at an end portion of the peripheral wall 305 positioned on one side in the longitudinal direction of the vehicle, a second end wall 302 extending substantially in the vertical direction at an end portion of the peripheral wall 305 positioned on the other side in the longitudinal direction of the vehicle, and an intermediate wall 303 extending substantially in the vertical direction between the first and second end walls 301 and 302.

As shown in FIGS. 7 to 9, the transmission case 300 accommodates the planetary gear mechanism 120, the traveling gear speed change mechanism 130, the PTO clutch mechanism 210 and the PTO gear speed change mechanism 220 in a first space 300a defined by the first end wall 301 and the intermediate wall 303, and accommodates the differential gear mechanism 140 in a second space 300b defined by the intermediate wall 303 and the second end wall 302.

The HST 110 is connected to the outer surface of the first end wall 301 of the transmission case 300 as described above (see FIG. 3).

The transmission case 300 preferably includes a case main body 320 having the intermediate wall 303 and the second end wall 302, and a lid member 310 having the first end wall 301 and detachably connected to the case main body 320 as shown in FIG. 6.

By forming the transmission case 300 with the case main body 320 and the lid member 310 that are detachably connected to each other, it is possible to easily install the transmission mechanisms in the first space 300a.

Figure 10:
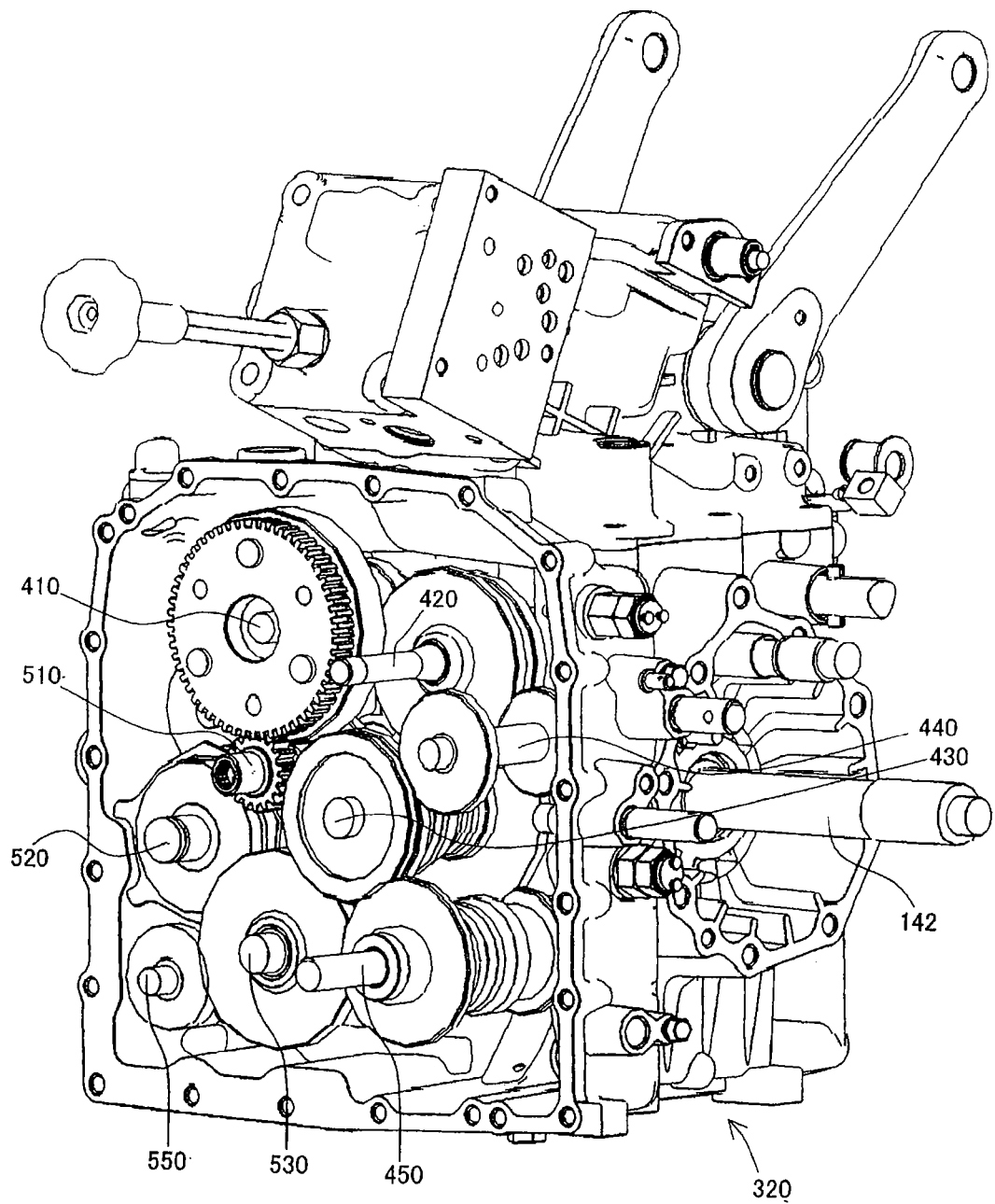
FIG. 10 is a perspective view of the transmission with a lid member of the transmission case being removed.
Figure 11:
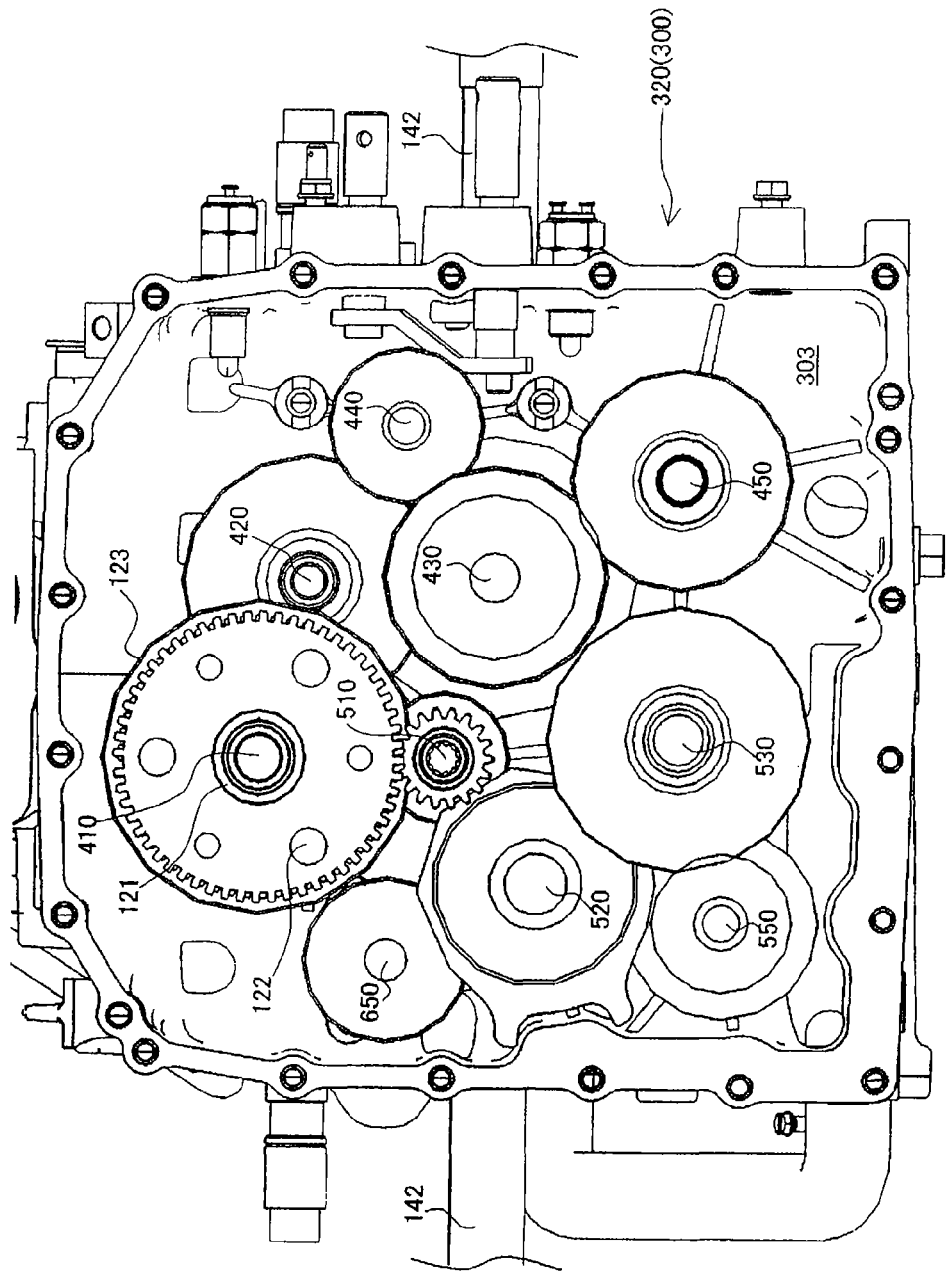
FIG. 11 is a front view of the transmission with the lid member of the transmission case being removed.

FIGS. 10 and 11 are a perspective view and a front view, respectively, of the transmission 100 in a state that the lid member 310 is removed.

Figure 12:
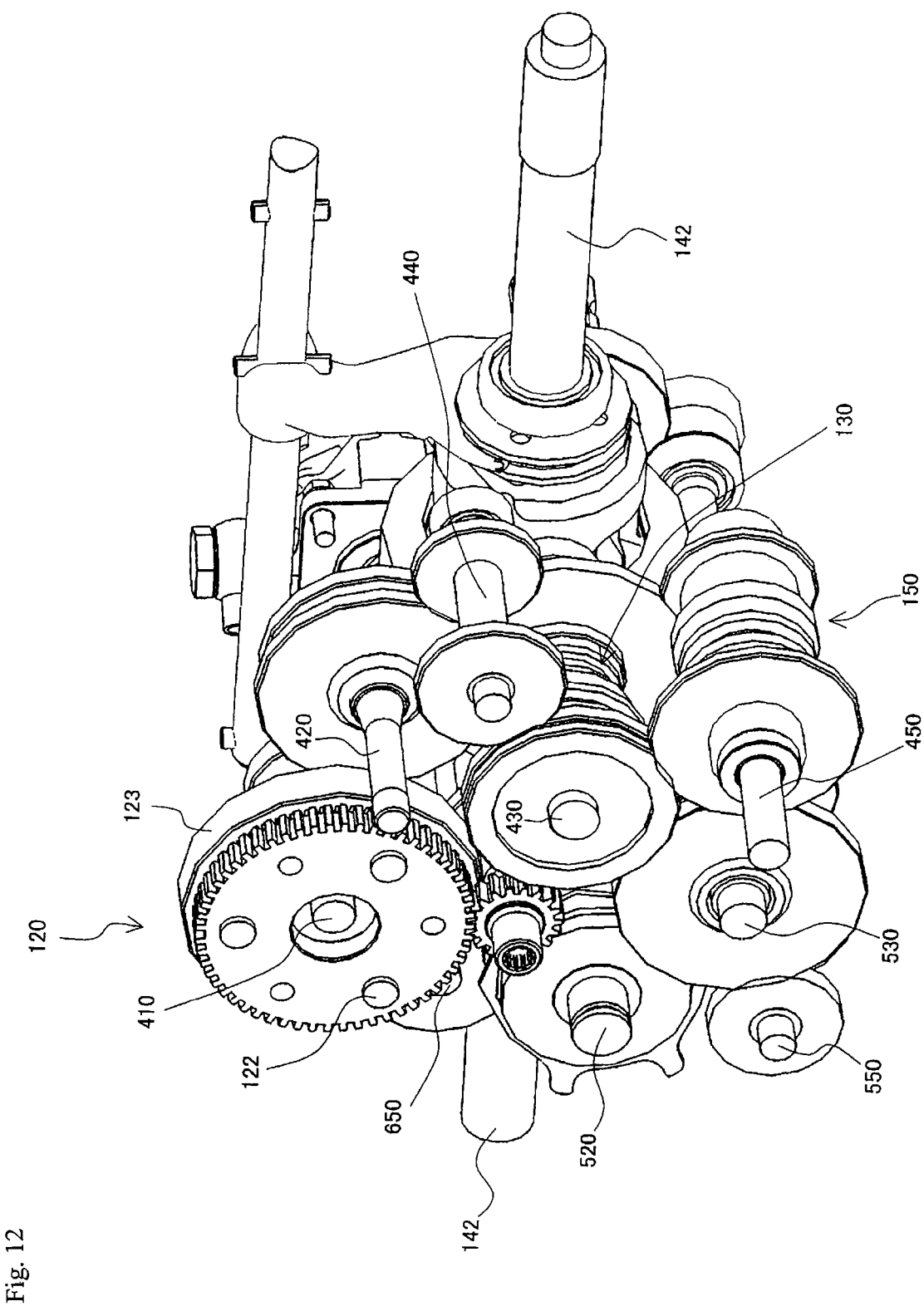
FIG. 12 is a perspective view of the transmission mechanisms of the transmission.

FIG. 12 is a perspective view of the transmission 100 in a state that the transmission case 300 is removed.

Figure 13:
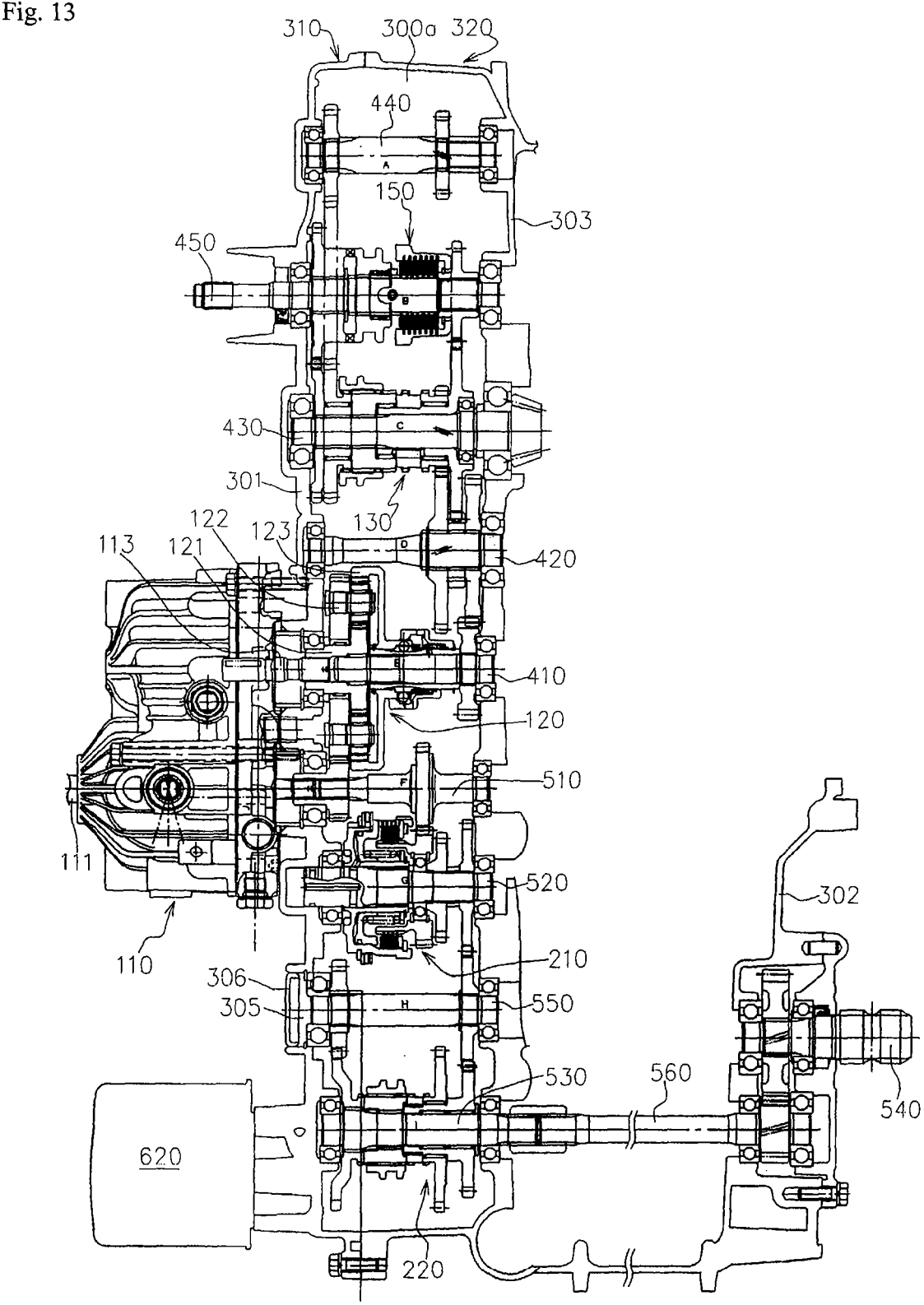
FIG. 13 is a partial developed sectional view of the transmission.

Moreover, FIG. 13 is a partial developed sectional view of the transmission 100.

As shown in FIGS. 2, 13 and the like, the HST 110 includes a pump shaft 111 operatively connected to the driving power source 20, a pump main body 112 supported by the pump shaft 111 in relatively non-rotatable manner, a motor main body 114 fluidly connected to the pump main body 112 through a pair of hydraulic fluid channels, a motor shaft 113 for supporting the motor main body 114 in a relatively non-rotatable manner, and an output-adjusting member 115 for changing supply/discharge oil amount of the pump main body 112 or the motor main body 114. The HST 110 is configured so as to non-stepwisely change a rotational speed of the motor shaft (an HST output shaft) 113 with respect to a rotational speed of the pump shaft (an HST input shaft) 111 by operating the output-adjusting member 115.

As shown in FIG. 13, the HST 110 is supported on the first end wall 301 in such a manner that end portions (rear end portions in the present embodiment) of the pump shaft 111 and the motor shaft 113 positioned on a downstream side in the power-transmitting direction pass through the first end wall 301 to enter into the first space 300a.

The planetary gear mechanism 120 includes three planetary elements, i.e., a sun gear 121, a planetary carrier 122 and an internal gear 123. The planetary gear mechanism 120 is configured so that a first element out of the three planetary elements functions as a constant-speed input portion to which constant-speed rotational power from the pump shaft 111 is inputted, a second element out of the three planetary elements functions as a variable-speed input portion to which variable rotational power from the motor shaft 113 is inputted, and a third element out of the three planetary elements functions as an output portion for outputting the rotational power made by combining the rotational power of the constant-speed input portion and the variable-speed input portion.

In the present embodiment, the planetary gear mechanism 120 is disposed concentrically with the motor shaft 113 as shown in FIGS. 2, 11, and 13.

The sun gear 121 functions as the variable-speed input portion operatively connected to the motor shaft 113, the planetary carrier 122 functions as the constant-speed input portion operatively connected to the pump shaft 111, and the internal gear 123 functions as the output portion.

The planetary gear mechanism 120 is preferably set to have a gear ration at which the planetary gear mechanism 120 is in a zero output state when the HST 110 is in a maximum output state in a reverse rotational direction and the planetary gear mechanism 120 is in a maximum output state when the HST 110 is in a zero output state (neutral state).

With such a structure, it is possible to improve transmission efficiency of the HST 110 and to reduce a load applied to the HST 110.

Now, the traveling rotational shafts in the traveling transmission mechanism will be described.

The traveling transmission mechanism includes a plurality of traveling rotational shafts disposed along the longitudinal direction of the vehicle so as to operatively connect between the planetary gear mechanism 120, the traveling gear speed change mechanism 130 and the differential gear mechanism 140.

To put it concretely, as shown in FIGS. 2, 11 and the like, the traveling rotational shafts include a planetary output shaft 410 operatively connected to the output portion (the internal gear 123 in the present embodiment) of the planetary gear mechanism 120 and disposed coaxially with the motor shaft 113, a traveling transmission shaft 420 displaced to one side in a width direction of the vehicle from the planetary output shaft 410, and a traveling speed change shaft 430 disposed below the traveling transmission shaft 420.

The traveling transmission shaft 420 is operatively connected to the planetary output shaft 410 through a gear train as shown in FIGS. 2 and 13.

The traveling speed change shaft 430 is operatively connected to the traveling transmission shaft 420 through the traveling gear speed change mechanism 130.

In other words, the traveling gear speed change mechanism 130 is configured so as to stepwisely change the rotational speed of the driving power between the traveling transmission shaft 420 and the traveling speed change shaft 430.

The traveling gear speed change mechanism 130 is preferably configured so as to be capable of changing a rotational direction of the driving power transmitted from the traveling transmission shaft 420 to the traveling speed change shaft 430.

In the present embodiment, as shown in FIGS. 2 and 13, the transmission 100 further includes a traveling idle shaft 440 as the traveling rotational shaft, the traveling idle shaft 440 being interposed in a power-transmitting path from the traveling transmission shaft 420 to the traveling speed change shaft 430.

The traveling idle shaft 440 is positioned between the traveling transmission shaft 420 and the traveling speed change shaft 430 in a vertical direction and is positioned on one side of the traveling transmission shaft 420 and the traveling speed change shaft 430 in the width direction of the vehicle as shown in FIGS. 10 to 12.

The traveling gear speed change mechanism 130 has a normal transmission mode for transmitting power from the traveling transmission shaft 420 to the traveling speed change shaft 430 not through the traveling idle shaft 440 and a reverse transmission mode for transmitting power from the traveling transmission shaft 420 to the traveling speed change shaft 430 through the traveling idle shaft 440.

In the present embodiment, the traveling gear speed change mechanism 130 is capable of performing two-stage speed change in the normal transmission mode as shown in FIG. 2.

The traveling speed change shaft 430 transmits the rotational power whose rotational speed has been changed or whose rotational direction has been changed to the reversed direction by the traveling gear speed change mechanism 130 to an input ring gear 141 of the differential gear mechanism 140.

In the present embodiment, as shown in FIG. 7, the traveling speed change shaft 430 is disposed substantially at the same height as a pair of differential output shafts 142 in the differential gear mechanism 140 and is operatively connected to the input ring gear 141 from one side in the longitudinal direction of the vehicle.

In the present embodiment, the traveling transmission mechanism 130 is configured so as to output the rotational power of the traveling speed change shaft 430 to sub-driving wheels (front wheels 40 in the present embodiment (see FIG. 2)) in addition to the main driving wheels (rear wheels 30 in the present embodiment).

To put it concretely, the transmission 100 further includes a sub-traveling output shaft 450 as the traveling rotational shaft, the sub-traveling output shaft 450 being operatively connected to the traveling speed change shaft 430 and protruding outward from the first end wall 301.

In the present embodiment, as shown in FIGS. 10 and 11, the sub-traveling output shaft 450 is disposed below the traveling speed change shaft 430.

The traveling transmission mechanism 130 preferably may include a sub-driving wheel speed increasing mechanism 150 as shown in FIGS. 2 and 13.

By providing the sub-driving wheel speed increasing mechanism 150, it is possible to increase the rotational speed of the front wheels so as to compensate for a difference between turning radiuses of the front wheels and the rear wheels, which is occurred when the working vehicle turns.

Next, PTO rotational shafts in the PTO transmission mechanism will be described.

The PTO transmission mechanism includes a plurality of PTO rotational shafts disposed along the longitudinal direction of the vehicle so as to output the power from the driving power source 20 outside via the PTO clutch mechanism 210 and the PTO gear speed change mechanism 220.

To put it concretely, as shown in FIGS. 2, 11, 13, and the like, the PTO rotational shafts include a PTO input shaft 510 coaxial with the pump shaft 111 and not rotatable about the axis line with respect to the shaft 111, a PTO clutch shaft 520 disposed below the PTO input shaft 510 and on the other side of the shaft 510 in the width direction of the vehicle, a PTO speed change shaft 530 disposed below the PTO clutch shaft 520, and a main PTO shaft 540 supported by the second end wall 302 of the transmission case 300 so as to protrude outward from the second end wall 302 in a state of being operatively connected to the PTO speed change shaft 530.

As shown in FIGS. 2 and 13, the PTO clutch shaft 520 is operatively connected to the PTO input shaft 510 through the PTO clutch mechanism 210.

In other words, the PTO clutch mechanism 210 selectively carries out engagement or interruption of power transmission between the PTO input shaft 510 and the PTO clutch shaft 520.

The PTO speed change shaft 530 is operatively connected to the PTO clutch shaft 520 through the PTO gear speed change mechanism 220.

In other words, the PTO gear speed change mechanism 220 stepwisely changes the rotational speed of the driving power between the PTO clutch shaft 520 and the PTO speed change shaft 530.

Preferably, the PTO gear speed change mechanism 220 is configured so as to change a rotational direction of the rotational power transmitted from the PTO clutch shaft 520 to the PTO speed change shaft 530.

In the present embodiment, as shown in FIGS. 2 and 13, the transmission 100 further includes a PTO idle shaft 550 as the PTO rotational shaft, the PTO idle shaft 550 being interposed in a power-transmitting path from the PTO clutch shaft 520 to the PTO speed change shaft 530.

The PTO idle shaft 550 is positioned below the PTO clutch shaft 520 and on the other side of the PTO speed change shaft 530 in the width direction of the vehicle as shown in FIGS. 10 to 12.

The PTO gear speed change mechanism 220 is configured so as to have a normal transmission mode for transmitting power from the PTO clutch shaft 520 to the PTO speed change shaft 530 through the PTO idle shaft 550 and a reverse transmission mode for transmitting power from the PTO clutch shaft 520 to the PTO speed change shaft 530 not through the PTO idle shaft 550.

In the present embodiment, the PTO gear speed change mechanism 220 is configured so as to carry out two-stage speed change in the normal transmission mode as shown in FIG. 2.

The main PTO shaft 540 outputs the rotational power transmitted from the PTO speed change shaft 530 outside.

In the present embodiment, as shown in FIGS. 2, 7, 8 and 13, the PTO transmission mechanism further includes a main PTO transmission shaft 560 as the PTO rotational shaft, the PTO transmission shaft 560 being positioned concentrically with the PTO speed change shaft 530 and connected with the shaft 530 in a relatively non-rotatable manner around its axis line.

To put it specifically, as shown in FIGS. 7 and 8, the main PTO transmission shaft 560 extends in the longitudinal direction of the vehicle so as to pass over (or be astride) the differential gear mechanism 140 at a position below the pair of differential output shafts 142 in the differential gear mechanism 140.

To put it more specifically, as shown in FIGS. 2, 7 and 8, the transmission 100 according to the present embodiment includes, in addition to the above components, a pair of driving axles 160 positioned below the pair of differential output shafts 142 in the differential gear mechanism 140 and operatively and respectively connected to the pair of differential output shafts 142 through reduction gear trains 170.

The main PTO transmission shaft 560 is disposed concentrically with the PTO speed change shaft 530 to thereby pass over the differential gear mechanism 140 by utilizing a space between the pair of driving axles 160.

In the present embodiment, the main PTO shaft 540 is connected to a downstream end portion of the main PTO transmission shaft 560 in the power-transmitting direction through a gear train.

The transmission 100 according to the present embodiment includes only the main PTO shaft 540 protruding outward from the second end wall 302 as the PTO shaft for outputting the rotational power from the driving power source 20 outside as described above.

However, depending on the specification, it is may be needed to also take the rotational power from the first end wall 301 of the transmission case 300 positioned opposite to the second end wall 302 in the longitudinal direction of the vehicle.

For example, if the transmission 100 according to the present embodiment is disposed on the rear side of the vehicle frame 30 in a case of being applied to a working vehicle having a mid-mount mower device, it is necessary to output the rotational power also from the first end wall 301.

Figure 14:
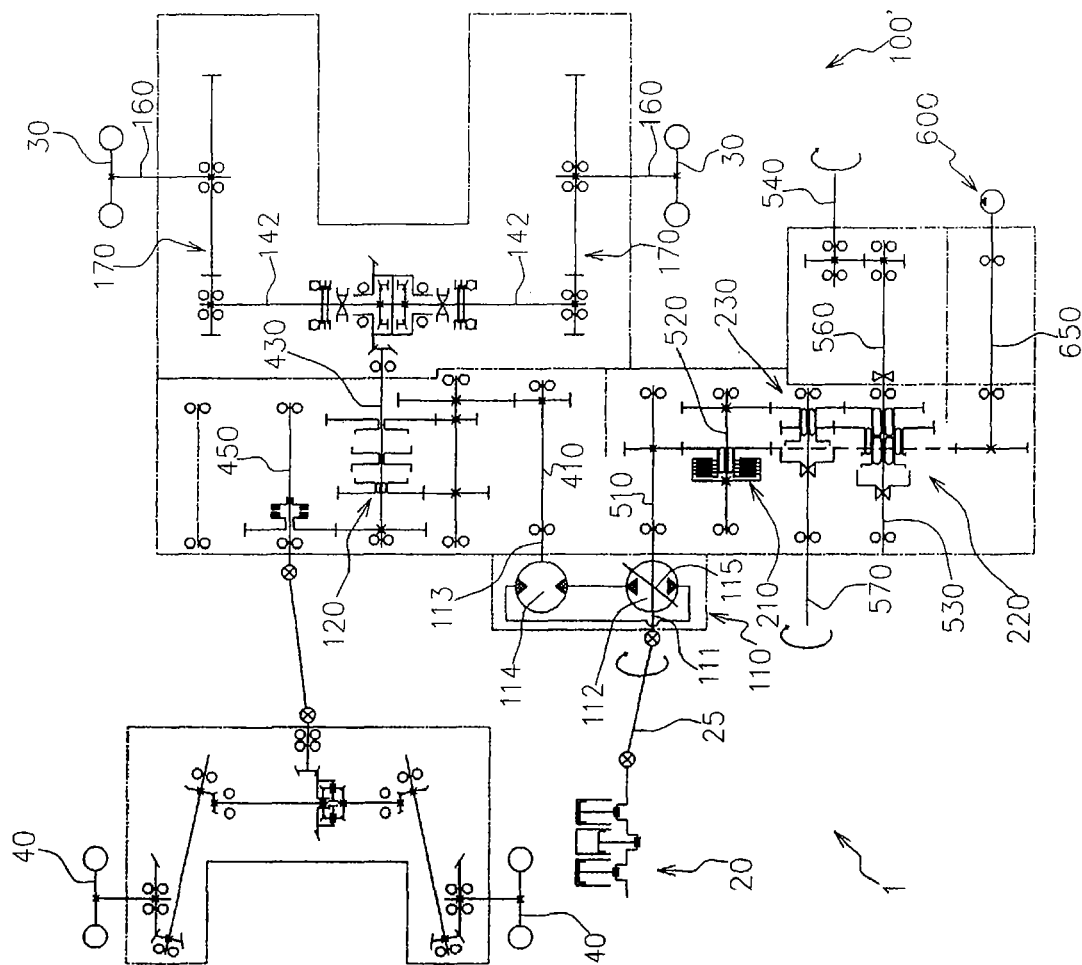
FIG. 14 is a transmission schematic diagram of a working vehicle to which a transmission modified from the transmission is applied.

FIG. 14 is a transmission schematic diagram of a vehicle including a transmission 100' that includes a sub-PTO shaft 570 provided at the first end wall 301 in addition to the main PTO shaft 540 provided at the second end wall 302.

The transmission 100' shown in FIG. 14 is configured so that the planetary gear mechanism 120 is eliminated to reduce the cost and a change-over between forward travel and reverse travel is performed by the HST 110.

In the transmission 100', the sub-driving wheel speed increasing mechanism 150 is also eliminated.

To enhance interchangeability between one specification shown in FIG. 2 and another specification shown in FIG. 14, the transmission 100 according to the present embodiment has the following structure.

Specifically, the transmission case 300 is configured so as to support the sub-PTO shaft 570 (see FIG. 14) instead of the PTO idle shaft 550 (see FIG. 2), the sub-PTO shaft 570 being operatively connected to the PTO speed change shaft 530.

In other words, in the transmission 100 according to the present embodiment, the transmission case 300 is configured so as to selectively support the PTO idle shaft 550 forming a part of the PTO gear speed change mechanism 220 or the sub-PTO shaft 570 operatively connected to the PTO speed change shaft 530.

The transmission case 300 is preferably provided with an access opening 305 for allowing access to the first space 300a from outside at a portion of the first end wall 301 supporting the PTO idle shaft 550 or the sub-PTO shaft 570 as shown in FIGS. 6 and 13.

With such a structure, it is possible to change the specification without additional working to the transmission case 300 by only closing the access opening 305 with a cap 306 (see FIGS. 4 and 13) when the PTO idle shaft 550 is mounted and by detaching the cap 306 when the sub-PTO shaft 570 is mounted.

In the specification where the sub-PTO shaft 570 is provided, the sub-PTO shaft 570 is preferably provided with a sub-PTO shaft clutch mechanism 230 as shown in FIG. 14.

The sub-PTO shaft clutch mechanism 230 makes it possible to achieve, in addition to a first output state where both the main PTO shaft 540 and the sub-PTO shaft 570 output the rotational power and a non-output state where both shafts dose not output the rotational power, which are selectively changed by the PTO clutch mechanism 210, a second output state where only the main PTO shaft 540 output the rotational power.

The transmission 100 according to the present embodiment further includes, in addition to the above components, an auxiliary pump unit 600 for discharging pressurized hydraulic fluid and an auxiliary pump transmission mechanism for transmitting the rotational power from the driving power source 20 to the auxiliary pump unit 600.

The auxiliary pump unit 600 is supported on an outer surface of the second end wall 302 of the transmission case 300 as shown in FIGS. 2, 5, 7, 8 and the like.

The auxiliary pump transmission mechanism has an auxiliary pump transmission shaft 650 for transmitting rotational power of the PTO input shaft 510 to the auxiliary pump unit 600 as shown in FIGS. 2, 8 and the like.

In the present embodiment, the auxiliary pump transmission shaft 650 is operatively connected to the PTO input shaft 510 through a driving-side member of the PTO clutch mechanism 210 supported on the PTO clutch shaft 520 as shown in FIG. 2.

In the present embodiment, the auxiliary pump transmission shaft 650 is positioned on the other side of a phantom vertical plane passing through axis lines of the pump shaft 111 and the motor shaft 113 in the width direction of the vehicle and is positioned above the PTO clutch shaft 520 as shown in FIG. 11, so that the auxiliary pump transmission shaft 650 could extend along the longitudinal direction of the vehicle within the second space 300b to transmit the rotational power to the auxiliary pump unit 600 while utilizing a space above the pair of differential output shafts 142 at a position on the other side in the width direction of the vehicle to avoid interference with the differential gear mechanism 140.

Figure 15:
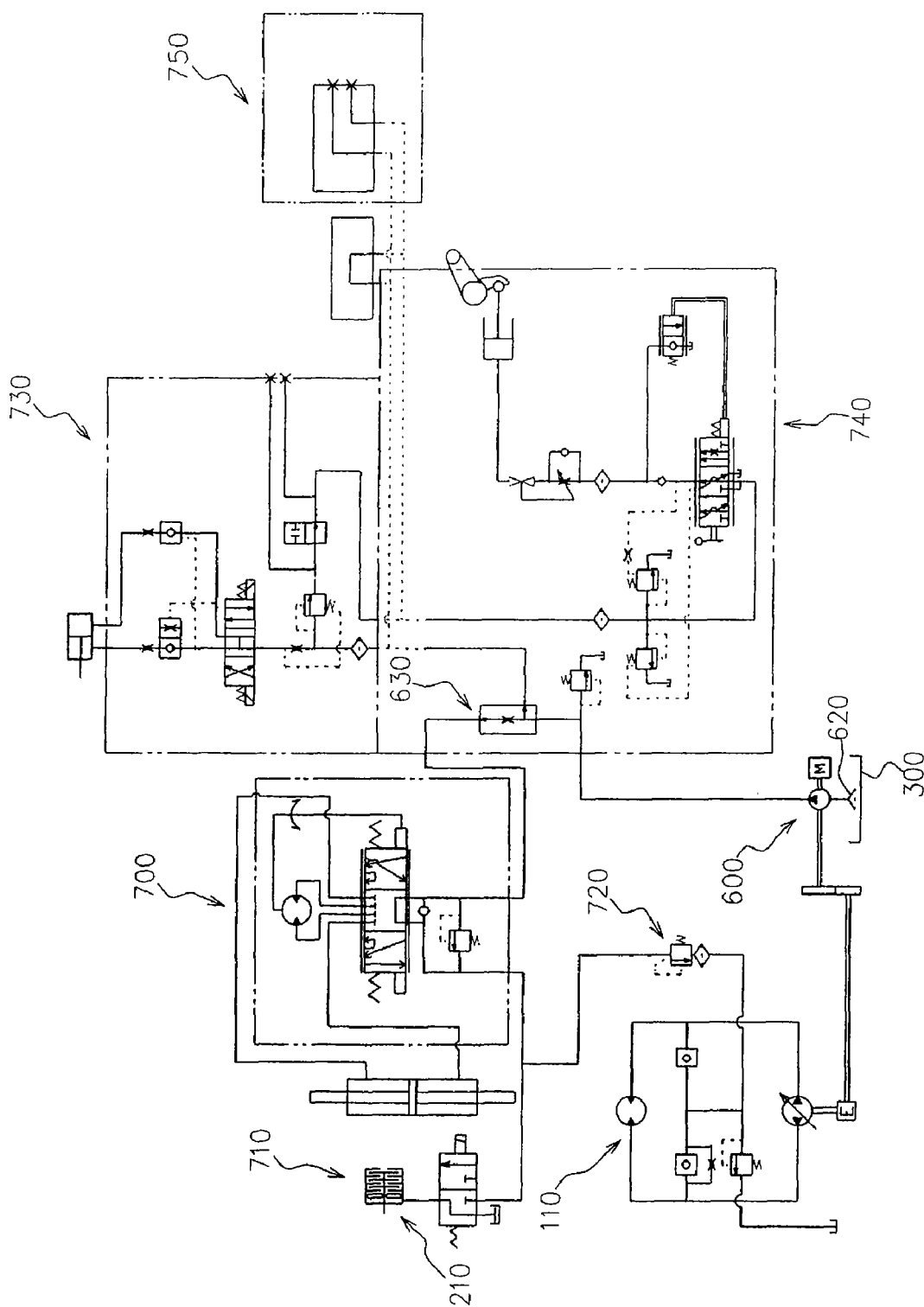
FIG. 15 is a hydraulic circuit diagram of the working vehicle.

FIG. 15 is a hydraulic circuit diagram in the working vehicle 1.

As shown in FIG. 15, the pressurized hydraulic fluid discharged from the auxiliary pump unit 600 is supplied via a flow diverting valve 630 to a first hydraulic circuit in which a power steering mechanism hydraulic circuit 700, a PTO clutch mechanism hydraulic circuit 710, and an HST charge hydraulic circuit 720 are connected in series and a second hydraulic circuit in which a horizontal control hydraulic circuit 730 and a hydraulic lift mechanism hydraulic circuit 740 for an working machine attached to the working vehicle 1 are connected in series.

In FIG. 15, a reference numeral 750 designates a hydraulic circuit for drawing oil to outside.

In the transmission 100 according to the present embodiment, as shown in FIG. 15, the transmission case 300 is utilized as an oil source of the auxiliary pump unit 600.

In other words, the transmission case 300 is capable of storing oil, thereby eliminating or downsizing a separate oil tank.

To put it specifically, the auxiliary pump unit 600 suctions oil stored in the transmission case 300 through a suction filter 620.

As shown in FIG. 4, the suction filter 620 is preferably connected to the first end wall 301 so as to be positioned between the sub-traveling output shaft 450 and the PTO idle shaft 550 (or the sub-PTO shaft 570) with respect to the width direction of the vehicle so that at least a part of the suction filter 620 overlaps the HST 110 in a plan view and so as to be positioned below the HST 110 with respect to a vertical direction so that at least a part of the suction filter 620 overlaps the sub-traveling output shaft 450 and the PTO idle shaft 550 (or the sub-PTO shaft 570) in a side view.

With such a structure, the HST 110, the suction filter 620 and the sub-traveling output shaft 450 (and the sub-PTO shaft 570) that protrudes outward from the first end wall 301 of the transmission case 300 could be arranged in such a manner that they are effectively apart one another, thereby effectively preventing the transmission shafts respectively and operatively connected to the pump shaft 111 of the HST 110 and the sub-traveling output shaft 450 (and the sub-PTO shaft 570) and a conduit connected to the suction filter 620 from being interfered with one another without enlarging the transmission case 300.

The transmission 100 having the above configuration achieves the following effects in addition to the above various effects.

In other words, in the transmission 100, the planetary gear mechanism 120, the traveling gear speed change mechanism 130, the PTO clutch mechanism 210 and the PTO gear speed change mechanism 220 are disposed between the first end wall 301 and the differential gear mechanism 140 with respect to the longitudinal direction of the vehicle, thereby securing a free space above the differential gear mechanism 140 as large as possible.

Therefore, it is possible to install the brake operating shaft and the differential lock operating shaft, which extend along the width direction of the vehicle, in a relatively flexible manner.

Moreover, with the above configuration, it is possible to reduce the transmission case 300 in size with respect to the vertical direction, thereby achieving a low position of a driver's seat 50 to be mounted above the transmission case 300 to thereby enable the driver to easily get on and/or off the driver's seat.

Furthermore, in the transmission 100 according to the present embodiment, as shown in FIG. 11 and the like, all the traveling rotational shafts are disposed concentrically with the motor shaft 113 or on one side of the motor shaft 113 in the width direction of the vehicle and below the shaft 113. All the PTO rotational shafts are disposed concentrically with the pump shaft 111 or below the pump shaft 111.

Therefore, it is possible to achieve an arrangement in which the traveling transmission mechanism supported on the traveling rotational shafts is put together in one space and the PTO transmission mechanism supported on the PTO rotational shafts is put together in the other space without difficulty, thereby downsizing the transmission case 300.

Although the case in which the PTO gear speed change mechanism is provided in the PTO transmission path has been described as an example in the present embodiment, it is also possible to eliminate the PTO gear speed change mechanism.

If the PTO gear speed change mechanism is unnecessary, the PTO speed change shaft is also eliminated and the main PTO shaft transmission shaft is operatively connected to the PTO clutch shaft.

Therefore, in such a structure, if the sub-PTO shaft is provided, the sub-PTO shaft is operatively connected to the main PTO shaft transmission shaft.

The invention claimed is:

1. A transmission with a transmission case having a first end wall to which an HST and a suction filter are connected and from which a sub-traveling output shaft and a sub-PTO shaft extend outward, wherein
the suction filter is connected to the first end wall so as to be positioned between the sub-traveling output shaft and the sub-PTO shaft with respect to a vehicle width direction so that at least a part of the suction filter overlaps the HST in a plan view and so as to be positioned below the HST with respect to a vertical direction so that at least a part of the suction filter overlaps the sub-traveling output shaft and the sub-PTO shaft in a side view.

2. A transmission of a vehicle including a traveling transmission path in which driving power is transmitted from an driving power source to a pair of right and left main driving wheels through an HST, a planetary gear mechanism, a traveling gear speed change mechanism and a differential gear mechanism, and a PTO transmission path in which driving power transmitted through a PTO clutch mechanism from the driving power source is output outside; the planetary gear mechanism, the traveling gear speed change mechanism, the differential gear mechanism and the PTO clutch mechanism being accommodated in a transmission case that is capable of storing oil; the HST being supported on an outer surface of a first end wall of the transmission case positioned on one side in a vehicle longitudinal direction; and the transmission being capable of drawing oil stored in the transmission case through a suction filter,
wherein traveling rotational shafts extending along the vehicle longitudinal direction and forming the traveling transmission path include
a planetary output shaft operatively connected to an output portion of the planetary gear mechanism that combines rotational power of the HST output shaft and the HST input shaft, the planetary output shaft being positioned coaxially with the HST output shaft,
a traveling transmission shaft displaced from the planetary output shaft to a first side in a vehicle width direction, a traveling speed change shaft positioned below the traveling transmission shaft and transmitting rotational power, which is transmitted from the traveling transmission shaft in a state that its rotational speed has been changed by the traveling gear speed change mechanism, to an input ring gear of the differential gear mechanism, and a sub-traveling output shaft positioned below the traveling speed change shaft and operatively connected to the traveling speed change shaft, the sub-traveling output shaft extending outward from the first end wall, wherein PTO rotational shafts extending along the vehicle longitudinal direction and forming the PTO transmission path include a PTO input shaft positioned coaxially with and relatively non-rotatable around its axis line to the HST input shaft, a PTO clutch shaft operatively connected to the PTO input shaft through the PTO clutch mechanism and positioned below and on a second side of the PTO input shaft in the vehicle width direction, the second side being opposite to the first side in the vehicle width direction, a main PTO transmission shaft operatively connected to and positioned below the PTO clutch shaft, a main PTO shaft operatively connected to the main PTO transmission shaft and supported by a second end wall of the transmission case positioned on a side opposite to the first end wall in the vehicle longitudinal direction so as to extend outward from the second end wall, and a sub-PTO shaft operatively connected to the main PTO transmission shaft and extending outward from the first end wall, and wherein the suction filter is connected to the first end wall so as to be positioned between the sub-traveling output shaft and the sub-PTO shaft with respect to the vehicle width direction so that at least a part of the suction filter overlaps the HST in a plan view and so as to be positioned below the HST with respect to a vertical direction so that at least a part of the suction filter overlaps the sub-traveling output shaft and the sub-PTO shaft in a side view.

3. A transmission of a vehicle according to claim 2, further comprising a PTO gear speed change mechanism accommodated in the transmission case and forming a part of the PTO transmission path, wherein the PTO rotational shafts further include a PTO speed change shaft transmitting rotational power, which is transmitted through the PTO gear speed change mechanism from the PTO clutch shaft, to the main PTO transmission shaft, the PTO speed change shaft being positioned coaxially with the main PTO transmission shaft, and the sub-PTO shaft is operatively connected to the PTO speed change shaft.

4. A transmission of a vehicle according to claim 3, wherein the HST is connected to the first end wall in a state that the HST output shaft is positioned above the HST input shaft.

5. A transmission of a vehicle according to claim 4, further comprising an auxiliary pump unit suctioning oil stored in the transmission case through the suction filter, the auxiliary pump unit being connected to the second end wall of the transmission case positioned on a side opposite to the first end wall in the vehicle longitudinal direction and rotationally driven through an auxiliary pump transmission shaft operatively connected to the PTO input shaft, wherein the auxiliary pump transmission shaft and the main PTO transmission shaft are arranged in such a manner that one shaft and the other shaft are respectively positioned above and below with a pair of differential output shafts of the differential gear mechanism as a reference.

6. A transmission of a vehicle according to claim 3, further comprising an auxiliary pump unit suctioning oil stored in the transmission case through the suction filter, the auxiliary pump unit being connected to the second end wall of the transmission case positioned on a side opposite to the first end wall in the vehicle longitudinal direction and rotationally driven through an auxiliary pump transmission shaft operatively connected to the PTO input shaft, wherein the auxiliary pump transmission shaft and the main PTO transmission shaft are arranged in such a manner that one shaft and the other shaft are respectively positioned above and below with a pair of differential output shafts of the differential gear mechanism as a reference.

7. A transmission of a vehicle according to claim 2, wherein the HST is connected to the first end wall in a state that the HST output shaft is positioned above the HST input shaft.

8. A transmission of a vehicle according to claim 7, further comprising an auxiliary pump unit suctioning oil stored in the transmission case through the suction filter, the auxiliary pump unit being connected to the second end wall of the transmission case positioned on a side opposite to the first end wall in the vehicle longitudinal direction and rotationally driven through an auxiliary pump transmission shaft operatively connected to the PTO input shaft, wherein the auxiliary pump transmission shaft and the main PTO transmission shaft are arranged in such a manner that one shaft and the other shaft are respectively positioned above and below with a pair of differential output shafts of the differential gear mechanism as a reference.

9. A transmission of a vehicle according to claim 2, further comprising an auxiliary pump unit suctioning oil stored in the transmission case through the suction filter, the auxiliary pump unit being connected to the second end wall of the transmission case positioned on a side opposite to the first end wall in the vehicle longitudinal direction and rotationally driven through an auxiliary pump transmission shaft operatively connected to the PTO input shaft, wherein the auxiliary pump transmission shaft and the main PTO transmission shaft are arranged in such a manner that one shaft and the other shaft are respectively positioned above and below with a pair of differential output shafts of the differential gear mechanism as a reference.

* * * * *